United States Patent
Ishiwatari

(10) Patent No.: US 7,367,189 B2
(45) Date of Patent: May 6, 2008

(54) SUPERCHARGING ASSIST CONTROL SYSTEM

(75) Inventor: Yuji Ishiwatari, Kariya (JP)

(73) Assignee: Denso Corporation, Kariya, Aichi-pref. (JP)

(*) Notice: Subject to any disclaimer, the term of this patent is extended or adjusted under 35 U.S.C. 154(b) by 0 days.

(21) Appl. No.: 11/353,947

(22) Filed: Feb. 15, 2006

(65) Prior Publication Data
US 2006/0260304 A1    Nov. 23, 2006

(30) Foreign Application Priority Data
Feb. 16, 2005    (JP) .............................. 2005-038778

(51) Int. Cl.
*F02B 33/34*    (2006.01)
(52) U.S. Cl. .................. 60/608; 60/606; 60/607; 60/609; 60/602
(58) Field of Classification Search ................. 60/602, 60/606–609
See application file for complete search history.

(56) References Cited

U.S. PATENT DOCUMENTS

| | | | | |
|---|---|---|---|---|
| 4,878,347 A | * | 11/1989 | Kawamura | 60/608 |
| 4,901,530 A | * | 2/1990 | Kawamura | 60/608 |
| 5,088,286 A | * | 2/1992 | Muraji | 60/608 |
| 2004/0093867 A1 | * | 5/2004 | Masuda | 60/608 |
| 2004/0194466 A1 | * | 10/2004 | Kawamura et al. | 60/612 |

FOREIGN PATENT DOCUMENTS

| | | | |
|---|---|---|---|
| JP | 06346748 A | * | 12/1994 |
| JP | 7-19063 | | 1/1995 |

* cited by examiner

*Primary Examiner*—Thomas Denion
*Assistant Examiner*—Mary A Davis
(74) *Attorney, Agent, or Firm*—Nixon & Vanderhye P.C.

(57) ABSTRACT

As the integral value of power obtained by integrating supply power to the three-phase stator coil of an assist motor with respect to time becomes larger, a motor temperature becomes higher. Then, the integral value of power obtained by integrating supply power to the three-phase stator coil of the assist motor with respect to time is detected and when this detected integral value of power is equal to or larger than a first determination value, supply power to the three-phase stator coil of the assist motor is limited. Then, when this detected integral value of power is equal to or larger than a second determination value, supply power to the three-phase stator coil of the assist motor is stopped.

12 Claims, 8 Drawing Sheets

SUPERCHARGING ASSIST CONTROL SYSTEM

CROSS-REFERENCE TO RELATED APPLICATION

This application is based on Japanese Patent Application No. 2005-38778 filed on Feb. 16, 2005, the disclosure of which is incorporated herein by reference.

FIELD OF THE INVENTION

The present invention relates to a supercharging assist control system.

BACKGROUND OF THE INVENTION

A vehicle such as an automobile has been conventionally mounted with a supercharged engine in which intake air sucked into the cylinder of the engine is supercharged by a turbocharger for the purpose of enhancing output power or reducing fuel consumption. Here, the turbocharger is a supercharger in which a turbine is rotated by the use of exhaust energy of the engine to drive a compressor mounted coaxially with this turbine to supercharge intake air. Hence, the turbocharger presents a problem that a boost pressure does not rise sharply in the low rotational speed range of the engine to lower an actual boost pressure to lower charging efficiency to thereby produce an insufficient improvement in the output of the engine.

For the purpose of solving this problem, a supercharging assist control system having a rotary motor built in a turbocharger (system for controlling a turbocharger provided with a motor) has been developed (for example, refer to JP-7-019063A). Moreover, a system for controlling a turbocharger provided with a motor, in which an electrically operated compressor for rotating and driving a compressor by a rotary motor is additionally mounted on a common turbocharger, has been also developed. Here, a rotary motor used for an electrically operated assist turbo-system is mounted on a turbine shaft. Then, when the torque of the engine needs to be increased, for example, when high load is applied to the engine in a low rotational speed range such as in the case of climbing up a long uphill, power is supplied from a battery to the rotary motor via a power conversion unit to electrically drive the turbocharger (motoring), which assists the supercharging operation of the compressor to thereby increase a boost pressure. Then, when there is a margin of exhaust energy, the rotary motor is rotated and driven by the turbine torque to regenerate electricity to thereby charge the battery.

For this reason, the power conversion unit is provided with a DC-DC converter for boosting direct current from the battery, an inverter for inverting the boosted direct current into alternating current of a specified frequency to variably control the rotational speed of the rotary motor, and a rectifier circuit for rectifying the alternating current outputted from the rotary motor to direct current. Here, the DC-DC converter can also lower the direct current voltage outputted from the rectifier circuit to produce a specified battery voltage. Here, in both of the above-mentioned systems, when the torque of the engine needs to be increased, the supercharging operation of the compressor needs to be assisted to increase the boost pressure and hence there is a case where the power conversion unit is continuously used for a long time. In this case, there is a possibility that the internal temperature of the power conversion unit increases to accelerate the deterioration of the respective electronic components of the power conversion unit to thereby cause the failure of the respective electronic components of the power conversion unit.

Then, in the power control device of a turbocharger provided with a motor, which is described in JP-7-019063A, the power conversion unit is provided with a temperature sensor, and the temperature of electronic components mounted in the power conversion unit (internal temperature of the power conversion unit) is measured by this temperature sensor. A temperature signal outputted from the temperature sensor is compared with a determination value (for example, a high limit and a reference temperature), and according to comparison result, operating the rotary motor is stopped so as to prevent the rotary motor from being failed by overheating or a maximum current applied to the electronic components of the power conversion unit is limited.

However, in the power control device of a turbocharger provided with a motor, a rotary motor is rotated at a high speed when the torque of the engine needs to be increased and is arranged in a place of high temperature of an engine room. Hence, there is presented a problem that the rotary motor under high temperature cannot be avoided from deterioration and failure.

Then, the following can be thought: that is, a temperature sensor is mounted on the motor case of the rotary motor; a motor temperature is measured by the temperature sensor; a temperature signal outputted from the temperature sensor is compared with a determination value; and according to the comparison result, energizing through the heating component of the rotary motor is stopped or power supplied to the heating components of the rotary motor is limited so as to prevent failure caused by overheating (to prevent the heating component from being overheated).

However, in the case of this system, because the temperature sensor is mounted on the motor case, the heating component of the rotary motor, in particular, the temperature of a motor winding part (for example, armature winding or field winding) is not found correctly and hence a determination value for protecting the motor from being overheated needs to be set at a lower value. Hence, it is impossible to make the most of the performance of the rotary motor, that is, supercharging assist performance. Moreover, because the temperature sensor needs to be added, there is presented the problem of increasing wirings and cost. Furthermore, there is presented a problem that when a break in a wiring between the temperature sensor and the controller and the faulty mounting of the temperature sensor occur, it is impossible to prevent the rotary motor from being overheated.

SUMMARY OF THE INVENTION

An object of the present invention is to provide a supercharging assist control system capable of taking measures against a failure caused by the overheating of a driving motor (measures to prevent a driving motor from being overheated) without necessitating a temperature sensor. Moreover, another object of the present invention is to provide a supercharging assist control system capable of estimating the internal temperature of a driving motor with high accuracy without necessitating a temperature sensor. According to the present invention, as supply power to a driving motor per unit time or the cumulative value of power obtained by cumulating supply power to the driving motor in terms of time or the integral value of power obtained by integrating supply power to a driving motor with respect to time is a larger value, the internal temperature of the driving motor (for example, the temperature of a heating component heating when supplied with power: in particular, temperature of motor winding part) becomes higher. Then, supply power to the driving motor per unit time, or the cumulative value of power obtained by cumulating supply power to the driving motor in terms of time, or the integral value of power obtained by integrating supply power to the driving motor with respect to time is detected by integral power detecting means.

Then, when the detection value of the integral power detecting means, that is, the supply power to the driving motor per unit time, or the cumulative value of power, or the integral value of power reaches a determination value previously set in such a way that the internal temperature of the driving motor does not exceed an upper limit for taking measures to protect the driving motor from being overheated, power supplied to the driving motor is limited to a value equal to or smaller than a specified value. With this, it is possible to take measures against a failure caused by the overheating of the driving motor (measures to prevent a driving motor from being overheated) without necessitating a temperature sensor. With this, it is possible to improve the reliability and durability of a supercharging assist control system provided with a driving motor, which is placed under comparatively high environment. Moreover, because it is not necessary to additionally provide a temperature sensor, there is not presented a problem that wiring and cost is increased and a problem that it is impossible to prevent the overheating of a driving motor.

BRIEF DESCRIPTION OF THE DRAWINGS

Other objects, features and advantages of the present invention will become more apparent from the following detailed description made with reference to the accompanying drawings.

DETAILED DESCRIPTION OF THE PREFERRED EMBODIMENTS

First Embodiment

Figure 1:
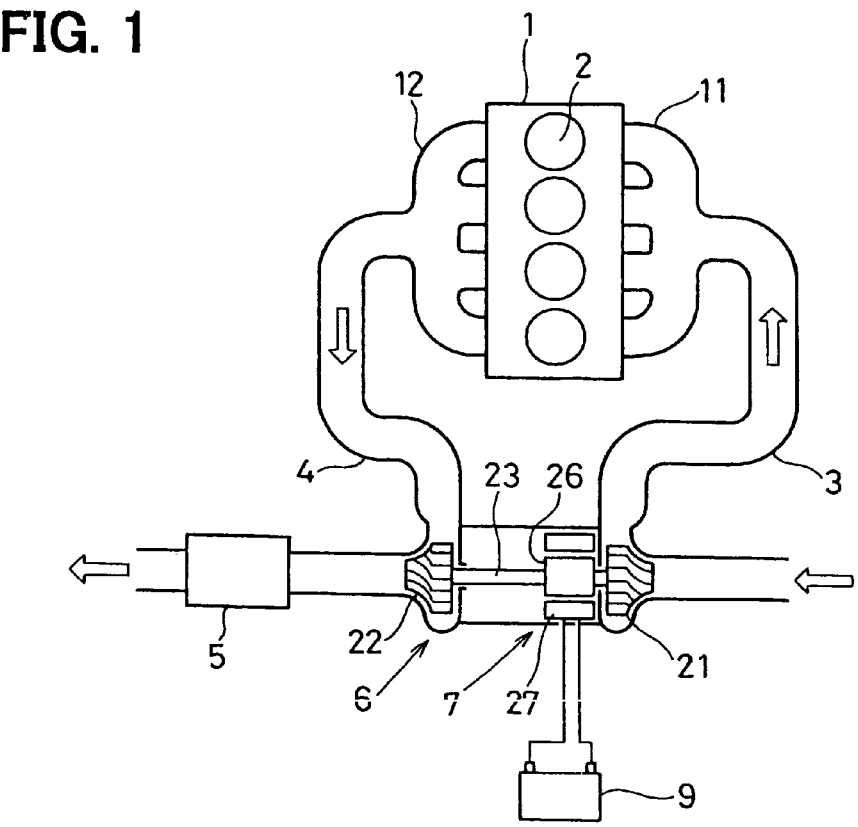
FIG. 1 is a schematic diagram showing a turbo-charged engine and its peripheral devices (first embodiment).
Figure 2:
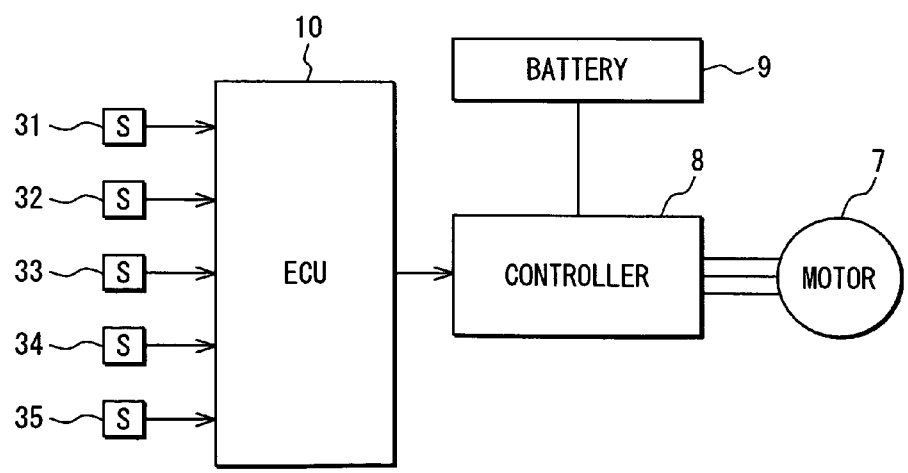
FIG. 2 is a construction diagram showing the control system of a turbo-charged engine control system (first embodiment).

FIG. 1 to FIG. 5 show first embodiment of the present invention. FIG. 1 is a diagram showing the general construction of a turbo-charged engine control system. FIG. 2 is a diagram showing the control system of a turbo-charged engine control system.

The turbo-charged engine control system of this embodiment includes: an exhaust emission control system for cleaning exhaust gas flowing out of an internal combustion engine (turbo-charged engine: hereinafter referred to as "engine") 1 such as a diesel engine provided with a turbocharger, which is mounted in a vehicle, for example; a turbocharger 6 for supercharging intake air into combustion chambers 2 of the respective cylinders of the engine 1 by the use of exhaust energy of exhaust gas flowing out of the engine 1; an electric generator (hereinafter referred to as "assist motor") 7 for electrically driving (motoring) this a turbocharger 6 to assist supercharging; and an engine control unit (hereinafter referred to as "ECU") 10 in which a motor control device for adjusting electric power supplied to this assist motor 7 to control the rotational speed of the assist motor 7 is built.

The engine 1 is a direct injection type diesel engine having fuel injected directly into the combustion chambers 2 and has an engine intake pipe 3 and an engine exhaust pipe 4 both of which communicate with the combustion chambers 2 of the respective cylinders of the engine 1. This engine 1 is mounted with intake valves (not shown) for opening and closing intake ports and exhaust valves (not shown) for opening and closing exhaust ports. Then, each intake port of the engine 1 is so constructed as to be supplied with intake air via an intake passage formed in the engine intake pipe 3 including an intake manifold (intake multi-branched pipe) 11. Then each exhaust port of the engine 1 is so constructed as to exhaust the exhaust gas into an exhaust passage formed in the engine exhaust pipe 4 including an exhaust manifold (exhaust multi-branched pipe) 12.

In this regard, the turbo-charged engine control system is mounted with a common rail type fuel injection apparatus (not shown) for injecting and supplying high-pressure fuel into the combustion chambers 2 of the respective cylinders of the engine. This common rail type fuel injection apparatus is provided with: a common rail (not shown) for accumulating fuel having high pressure corresponding to the injection pressure of fuel; a supply pump (fuel injection pump: not shown) for pressurizing fuel sucked into a pressurizing chamber through a suction control valve (SCV: not shown) as an actuator fuel to high pressure and for pressure-supplying this high-pressure fuel to the common rail; and a plurality of injectors (INJ: not shown) for injecting and supplying high-pressure fuel accumulated in the common rail into the combustion chambers 2 of the respective cylinders of the engine 1. Here, each of the plurality of injectors is provided with an actuator such as a solenoid valve for driving a nozzle needle (valve element) in a direction to open the valve.

The exhaust emission control system is provided with a catalyst converter case 5 which is arranged in the engine exhaust pipe 4 closer to the downstream side in the direction of flow of exhaust gas than the turbocharger 6 and in which, for example, a diesel particulate filter (DPF: not shown) for collecting exhaust particulates (PM) included in exhaust gas and an oxidation catalyst converter (not shown) arranged at a position closer to the upstream side in the direction of flow of exhaust gas than this DPF are built.

The turbocharger 6 is provided with a compressor 21 mounted in the middle of the engine intake pipe 3 and a turbine 22 mounted in the middle of the engine exhaust pipe 4 This turbine 22 rotates integrally with the compressor 21 via a rotor shaft (turbine shaft) 23. Here, an air-cooled or water-cooled intercooler 24 (refer to FIG. 6) for cooling intake air, which is compressed (supercharged) by the compressor 21 of the turbocharger 6 and is increased in temperature, may be arranged in the middle of the engine intake pipe 3. Then, a filtering element (air filter) for collecting foreign particles in intake air is housed in an air cleaner 25 (refer to FIG. 6) arranged on the upstream side of the engine intake pipe 3.

The compressor 21 is fixed to one end in the direction of central axis (axial direction) of the rotor shaft 23 and is provided with a compressor wheel having a plurality of compressor blades. This compressor wheel is rotatably housed in a compressor housing in such a way as to supercharge intake air flowing in the engine intake pipe 3. Then, an intake air supply passage formed in the compressor housing is formed in a spiral shape along the rotational direction of the compressor wheel so as to surround the outer periphery of the compressor wheel.

The turbine 22 is fixed to the other end in the axial direction of the rotor shaft 23 and has a turbine wheel having a plurality of turbine blades. This turbine wheel is rotatably housed in a turbine hosing in such a way as to be rotated by exhaust gas flowing in the engine exhaust pipe 4. Then, an exhaust gas discharge passage formed in the turbine housing is formed in a spiral shape along the rotational direction of the turbine wheel in such a way as to surround the outer periphery of the turbine wheel. Then, the assist motor 7 is mounted between the compressor 21 and the turbine 22 and on the compressor 21 side in the axial direction of the rotor shaft 23 of the present embodiment.

The assist motor 7 corresponds to a driving motor of the present invention and is a motor generator having a function as an electric motor for rotating the rotor shaft 23 to rotate and drive the compressor 21 and the turbine 22 to perform supercharging assist and a function as a generator that is rotated and driven by the exhaust energy of the engine 1 to regenerate electricity. This assist motor 7 is an alternating current (AC) motor such as a three-phase induction motor generator including a rotor 26 integrated with the rotor shaft 23 and a stator 27 opposed to the outer peripheral side of this rotor 26. The rotor 26 is provided with a rotor core having a permanent magnet and the stator 27 is provided with a stator core around which three phase stator coils are wound.

Here, the three phase stator coils construct heating parts (motor winding parts) that generate heat when they are supplied with electric power. Then, the assist motor 7 functions as an electric motor when assist supercharging is required. At this time, the assist motor 7 is electrically connected to the ECU 10 via a power conversion unit (hereinafter referred to as "controller") 8. Then, the assist motor 7 functions as a generator when assisting to supercharge is not necessary. At this time, the assist motor 7 is electrically connected to a battery 9 or other electric device mounted in a vehicle via the controller 8. At the time of power regeneration mode like this, electric power regenerated by the assist motor 7 is returned to the battery 9 via the rectifier circuit of the controller 8 and a DC-DC converter. When the returned power is effectively used to cover a portion of power consumed by various kinds of electric devices, the electric loads of the various kinds of electric devices can be decreased by a large amount. For this reason, the driving load of an alternator, which is an engine auxiliary rotated and driven by the engine 1, is reduced by power regenerated by he assist motor 7. This can improve fuel consumption.

Here, the ECU 10, as shown in FIG. 2, is provided with a microcomputer having a well-known structure so constructed as to include: a CPU for performing control processing and operating processing; a storage device for storing a control program or a control logic or data (volatile memory such as SRAM and DRAM, and a non-volatile memory such as EPROM EEPROM or flash memory); and functions of an input circuit, an output circuit, a power circuit, and the like. Then, the ECU 10 is constructed in such a way that when an ignition switch is turned on (IG ON), it performs feedback control so as to cause, for example, the fuel pressure in the common rail (common rail pressure), actual supercharging pressure (actual intake pressure), and the amount of intake air to be equal to their control command values on the basis of a control program or a control logic stored in the memory.

Moreover, a pump driving circuit for applying an SCV driving current to the suction control valve of the supply pump and an injector driving circuit for applying an INJ driving current to the solenoid valve of the injector are interposed between the ECU 10 and the actuators of the respective systems. Then, a controller 8 is interposed between the ECU 10 and the assist motor 7 of the turbocharger 6. Then, the controller 8 is provided with: a DC-DC converter for boosting direct current power from the battery 9; an inverter for converting the boosted direct current power to alternating current power of a specified frequency to variably control the rotational speed of the assist motor 7; and a rectifier circuit for rectifying an alternating current outputted from the three-phase stator coil of the assist motor 7 to a direct current.

Then, the DC-DC converter can also produce a smooth stable battery voltage after a direct current voltage outputted from the rectifier circuit is lowered. Then, the inverter is rotational speed control means that varies power supplied to the three-phase stator coil of the assist motor 7 (for example, driving current=output current of inverter) on the basis of a control signal from the ECU 10 to control the rotational speed of the rotor shaft 23 of the assist motor 7. Then, the controller 8 has the function of computing the rotational speed of the rotor shaft 23 of the turbocharger 6 (or assist motor 7) on the basis of power supplied to the three-phase stator coil of the assist motor 7. Here, there may be provided a rotational speed sensor for converting the rotational speed of the rotor shaft 23 of the turbocharger 6 (or assist motor 7) to an electric signal and for outputting the electric signal.

Then, the ECU 10 is constructed in such a way that signals of various kinds of sensors such as a crank angle sensor 31 for detecting the rotational angle of a crankshaft of the engine 1, a cooling water sensor 32 for detecting an engine cooling water temperature, a fuel temperature sensor 33 for detecting a fuel temperature are A/D converted by an AND converter and then are inputted to a microcomputer built in the ECU 10. Here, the crank angle sensor 31 is constructed of a pickup coil for converting the rotational angle of the crankshaft of the engine 1 to an electric signal and outputs an NE pulse signal, for example, for each 30° CA (crank angle). Then, the ECU 10 functions as rotational speed detecting means for measuring the interval time of the NE pulse signal outputted by the crank angle sensor 31 to detect the rotational speed of the engine 1 (hereinafter referred to as "engine speed": NE).

Moreover, to the ECU 10 is connected with an accelerator opening sensor 34 for converting the amount of operation of an accelerator by a driver (the amount of depression of an accelerator pedal) to an electric signal (accelerator position signal) and for outputting the amount of depression of the accelerator pedal to the ECU 10. The electric signal (accelerator position signal) outputted from this accelerator position sensor 34, as is the case with the other sensors, is A/D converted by the A/D converter and then is inputted to the microcomputer. Then, a boost pressure sensor 35 for detecting the boost pressure of intake air supercharged by the turbocharger 6 is connected to the ECU 10. The electric signal (sensor signal) outputted from this boost pressure sensor 35, as is the case with the other sensors, is A/D converted by the A/D converter and then is inputted to the microcomputer. Here, the boost pressure sensor 35 converts intake pressure (actual boost pressure, actual intake pressure) in the engine intake pipe 3 to an electric signal and outputs the electric signal.

Then, the ECU 10 has: the function (injection amount setting means) of adding the amount of correction of injection considering an engine cooling water temperature and a fuel temperature to the basic amount of injection (Q) set according to the engine speed (NE) and an accelerator position (ACCP) to compute the target amount of injection (the command amount of injection: QFIN); the function (injection timing setting means) of computing a command injection timing (TFIN) by the engine speed (NE) and the command amount of injection (QFIN); and the function (injection period setting means) of computing an injection command pulse length (=the command amount of injection, command injection period: TQFIN) corresponding to time during which energizing is performed through the solenoid valve of the injector by the command amount of injection (QFIN) and the fuel pressure (common rail pressure: PC) in the common rail detected by a fuel sensor (not shown) set in the common rail.

Moreover, the ECU 10 has fuel pressure control means for computing an optimum fuel injection pressure according to the operating state of the engine 1 and for driving the intake control valve of the supply pump via a pump driving circuit. The fuel pressure control means has the function (fuel pressure setting means) of computing a target fuel pressure (PFIN) by the command amount of injection (QFIN) and the engine speed (NE) and is so constructed as to control a pump driving current to be applied to the intake control valve to feed back the amount of discharge of fuel discharged from the supply pump so as to achieve the target fuel pressure (PFIN).

[Control Method of First Embodiment]

Figure 3:
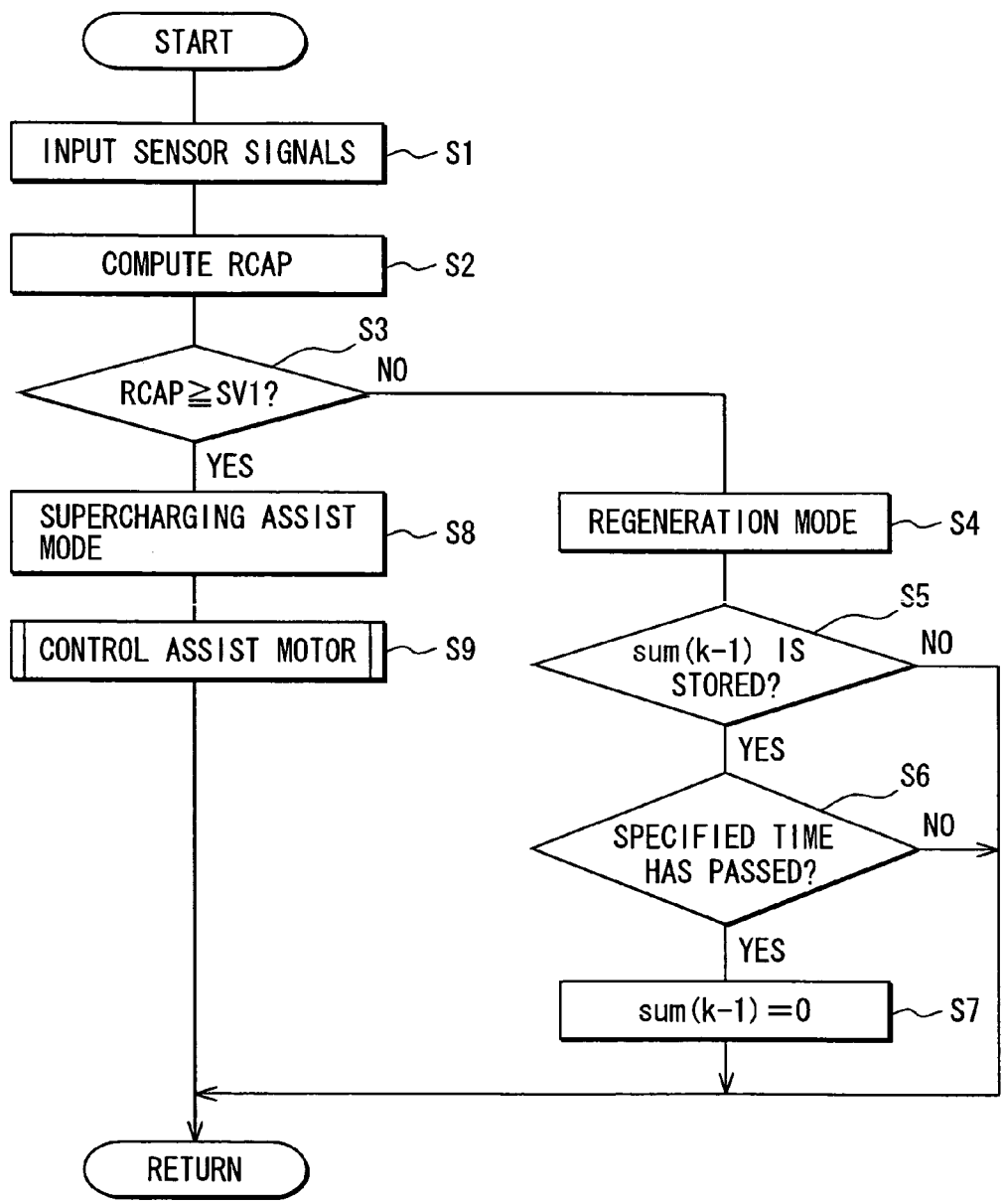
FIG. 3 is a flow chart showing a method for controlling the turbo-charged engine control system (first embodiment).

Next, a method for controlling a turbo-charged engine control system of the present embodiment will be described in brief on the basis of FIG. 1 to FIG. 5. Here, FIG. 3 is a flow chart showing the method for controlling the turbo-charged engine control system. A control routine shown in FIG. 3 is repeatedly performed at specified control periods after the ignition switch is turned on.

First, various sensor signals, engine operating information, and system operating information required to compute the operating state or operating condition of the engine 1 are inputted (step S1). Specifically, the engine speed, the acceleration position, the command amount of injection, and the target fuel pressure are read. Here, the engine speed is detected by measuring the interval time of the NE pulse signal outputted from the crank angle sensor 31. Then, the command amount of injection is computed by adding the amount of correction of injection considering the fuel temperature and the engine cooling water temperature to the basic amount of injection that is set according to the engine speed and the acceleration position.

Next, the rate of change in acceleration position RCAP is computed based on the acceleration position (step S2). Here, the rate of change in acceleration position RCAP is found from the amount of change per unit time of the acceleration position (the amount of change of the acceleration position) detected by the acceleration position sensor 34. Next, for the purpose of determining whether or not supercharging assist is necessary, it is determined whether the engine 1 is in an accelerating state or in a steady state. Specifically, it is determined whether or not the rate of change in acceleration position RCAP is equal to or larger than a specified value SV1 (step S3). Here, for the purpose of determining whether or not supercharging assist is necessary, it is also recommendable to determine whether the engine speed is within a low speed range or within a high speed range.

When the determination result in this step S3 is NO, it can be determined that the engine 1 is in a steady state and in a speed reducing state where supercharging assist is not necessary and hence the assist motor 7 is switched to a power regeneration mode in which the assist motor 7 is rotated and driven by the turbocharger 6 (step S4). That is, when energizing is performed (ON) through the three-phase stator coil of the assist motor 7 until the last control period, energizing through the three-phase stator coil of the assist motor 7 is stopped (OFF). Then, when energizing through the three-phase stator coil of the assist motor 7 is stopped (OFF) by the last control period, the state where energizing through the three-phase stator coil of the assist motor 7 is stopped (OFF) is continued.

At the time of this power regeneration mode, the turbocharger 6 functions as a usual turbocharger using only the exhaust energy of exhaust gas flowing out of the engine 1. Next, it is determined whether or not the integral value of power (sum (k−1): value of the last control period) is stored in a volatile memory such as a DRAM or a non-volatile memory such as an EEPROM (step S5). When this determination result is NO, the processing passes through the control routine shown in FIG. 3.

Then, when the determination result in step S5 is YES, a supercharging assist mode is switched to a power regeneration mode, that is, energizing through the three-phase stator coil of the assist motor 7 is stopped (OFF) and then it is determined whether or not a specified time has passed (step S6). When this determination result is NO, the processing passes through the control routine shown in FIG. 3.

Then, when the determination result in step S6 is YES, the integral value of power (sum (k−1): value of the last control value) stored in the volatile memory such as a DRAM or the non-volatile memory such as an EEPROM is erased or the integral value of power (sum (k−1): value of the last control value) is reset. Specifically, the integral value of power (sum (k−1): value of the last control value) incremented and stored by the last control period is returned to an initial state (sum (k−1)=0 Wh) (step S7). Then, the processing passes through the control routine shown in FIG. 3.

Figure 4:
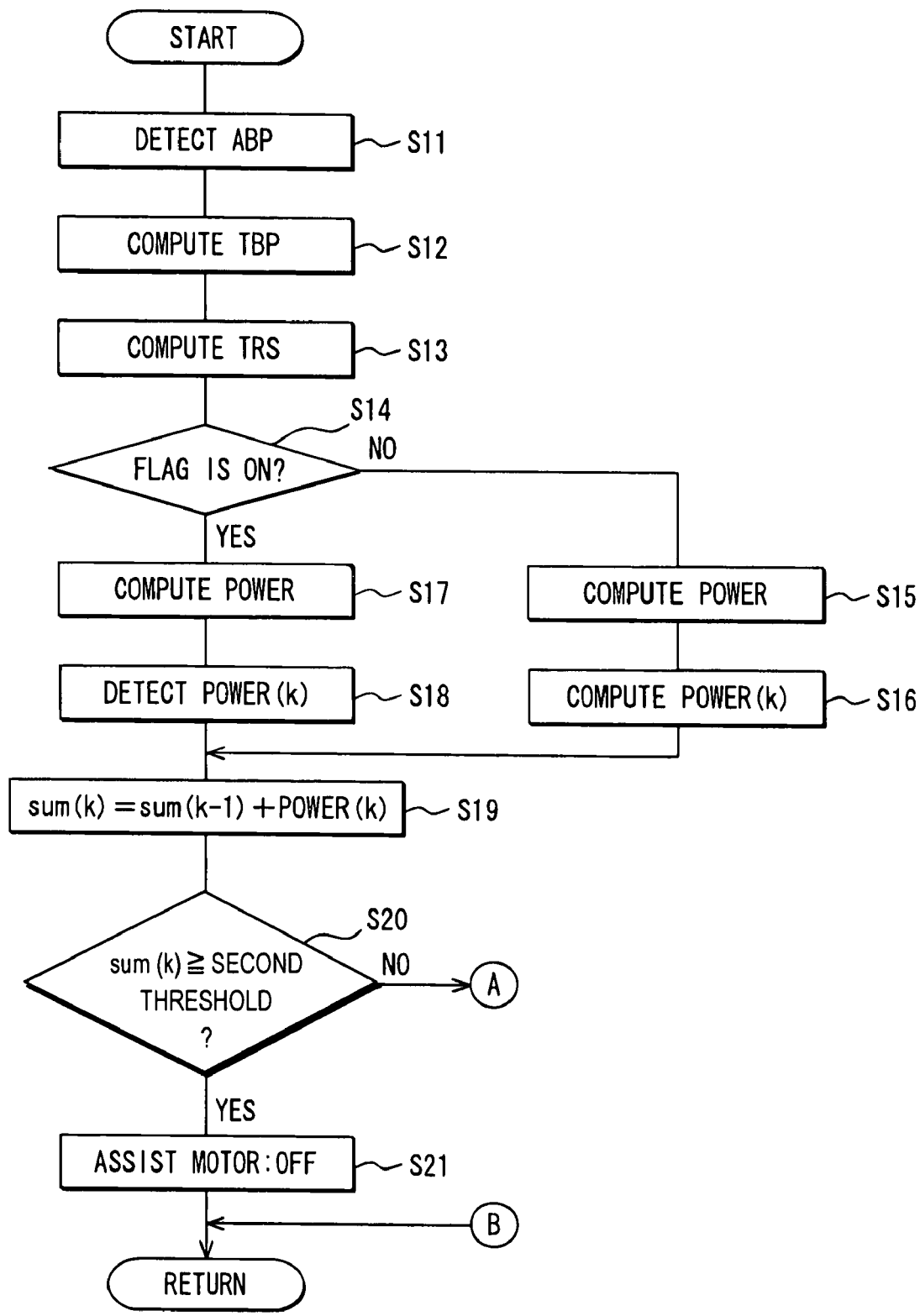
FIG. 4 is a flow chart showing a method for controlling the rotational speed of an assist motor (first embodiment).
Figure 5:
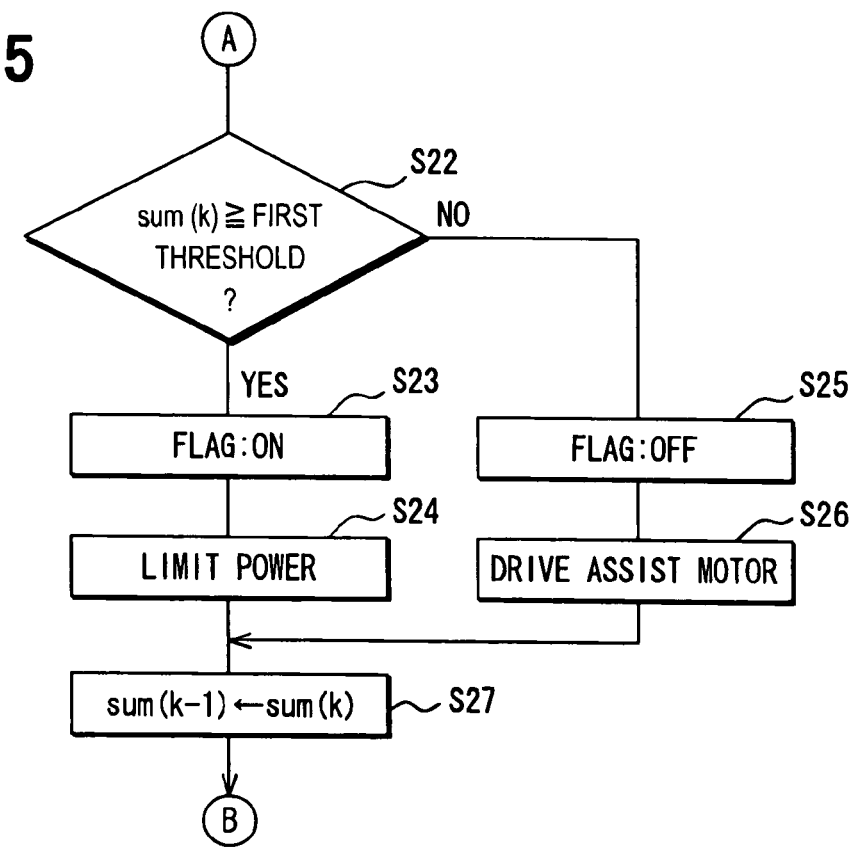
FIG. 5 is a flow chart showing a method for controlling the rotational speed of the assist motor (first embodiment).

Then, when the determination result in step S3 is YES, it can be determined that the engine 1 is in an accelerating state where the supercharging assist is necessary and hence the operational mode is switched to the supercharging assist mode in which the compressor 21 and the turbine 22 of the turbocharger 6 are rotated and driven by the assist motor 7 (step S8). Next, a control routine shown in FIG. 4 and FIG. 5 is executed to control power supplied to the three-phase stator coil of the assist motor 7 to control the rotational speed of the assist motor 7 (step S9). Thereafter, the processing passes through the control routine shown in FIG. 3.

Here, FIG. 4 and FIG. 5 are flow charts for showing a method for controlling the rotational speed (motor speed) of the assist motor 7. The control routines shown in FIG. 4 and FIG. 5 are repeatedly executed at specified control periods when the supercharging assist mode is performed.

First, the electric signal outputted from the boost pressure sensor 35 is inputted to detect an actual boost pressure ABP (step S11). Next, a target boost pressure TBP is computed from the engine speed and the command amount of injection (or accelerator position) (step S12). This target boost pressure TBP may be read from a map made by measuring the relationship between these in advance by experiments or the like. Next, a target rotational speed TRS in this control period is computed according to the deviation between an actual boost pressure detected by the boost pressure sensor 35 and the target boost pressure (step S13).

Next, it is determined whether or not a power supply limiting flag is set (ON) (step S14). When the determination result in this step S14 is NO, a motor parameter necessary for controlling the rotational speed of the assist motor 7 in this control period is computed (or captured). Specifically, supply power (motor power: POWER) to the three-phase stator coil of the assist motor 7, which is necessary for causing the rotational speed of the assist motor 7 to be nearly equal to the target rotational speed, is computed (step S15). This supply power (POWER) is computed by using a driving current (inverter output current) to be flown through the three-phase stator coil of the assist motor 7 and an application voltage to be applied to the three-phase stator coil of the assist motor 7.

Next, the integral value of power (POWER (k)) when the supply power (POWER) computed in step S15 is supplied to the three-phase stator coil of the assist motor 7 for the duration between this control period and the next control period is detected (computed)(integral power detecting means: step S16). Thereafter, the processing proceeds to operation processing in step S19. This integral value of power (POWER (k)) is the integral amount of power (Wh) obtained by integrating the supply power to the three-phase stator coil of the assist motor 7 with respect to time. Here, in the present embodiment, the integral value of power (POWER (k)) is computed as the integral amount of power (Wh) for the interval time of the control period.

Then, when the determination result in step S14 is YES, supply power (motor power: POWER) for limiting power supply is computed (step S17). At this time, in the case where a harmful effect such as impact is produced when the supply power (POWER) is suddenly reduced to a value equal to or smaller than a specified value, a sudden change (drop) in the rotational speed of the assist motor 7 needs to be avoided. In this case, it is also recommendable to employ some contrivance (means for performing gradual power control) to reduce supply power (POWER) gradually from steady supply power (POWER) to a value equal to or smaller than a specified value for the duration between this control period and the next control period. Then, when this gradual power control is performed, the gradual power control may be performed continuously for the duration between this control period and the next control period or for the duration between this control period and a control period after next that is after the next control period.

Next, the integral value of power (POWER (k)) when the supply power (POWER) computed in step S17 and for limiting power supply is supplied to the three-phase stator coil of the assist motor 7 for the duration between this control period and the next control period is detected (computed)(integral power detecting means: step S18). Next, the integral value of power (sum (k): value of this control period), which is the amount of power consumed from the time to start energizing through the three-phase stator coil of the assist motor 7 to the time of the next control period, is computed by adding the smaller integral value of power (POWER (k)) of the integral value of power (POWER (k)) computed in step S16 and the integral value of power (POWER (k)) computed in step S18 to the integral value of power (sum (k−1): value of the last control period), which is added (incremented) on the basis of a computing equation of the following equation 1 by the last control period and is stored and held in the volatile memory such as DRAM or the nonvolatile memory such as EEPROM (step S19).

$$\text{sum}(k) = \text{sum}(k-1) + \text{POWER}(k) \quad (1)$$

In this regard, in the present embodiment are considered two cases of: a case where energizing is continuously performed through the three-phase stator coil of the assist motor 7 for a duration between the time to start energizing through the three-phase stator coil of the assist motor 7 and the time of the next control period; and a case where energizing is intermittently performed through the three-phase stator coil of the assist motor 7 for the duration between the time to start energizing through the three-phase stator coil of the assist motor 7 and the time of the next control period. Then, in both cases, the integral value of power (sum (k): value of this control period) can be computed by the same computing method.

However, when the operating state is brought into a steady state or a decelerating state where the supercharging assist is not necessary to bring the operational mode into a power regeneration mode and hence energizing through the three-phase stator coil of the assist motor 7 is once stopped, the determination processing in step S6 is performed. Then, when the time during which energizing through the three-phase stator coil of the assist motor 7 is stopped is longer than a specified time, as described above, the integral value of power (sum (k−1): value of the last control period) having been added (incremented) by the last control period and stored and held is returned to the initial state (sum (k−1)=0 Wh). Therefore, in this case, when energizing through the three-phase stator coil of the assist motor 7 is again started, the integral value of power (sum (k): value of this control period) becomes the integral value of power (POWER (k)) when the above-mentioned supply power (POWER) is supplied to the three-phase stator coil of the assist motor 7 for the duration between this control period and the next control period.

Next, it is determined whether or not the integral value of power (sum (k): value of this control period) is equal to or larger than a determination threshold (second determination value: Threshold) (step S20). When the determination result in this step S20 is YES, the ECU 10 outputs a supply power cutting command to the controller 8. With this, the controller 8 stops (OFF) supplying power to (energizing through) the three-phase stator coil of the assist motor 7 (power supply limiting means: step S21). Thereafter, the processing passes through the control routine in FIG. 4.

Here, in the case of stopping supplying power to the three-phase stator coil of the assist motor 7, it is also recommended to return the integral value of power (sum (k−1): value of the last control period) having beep added (incremented), stored, and held by the last control period to the initial state (sum (k−1i)=0 Wh) after a specified time and then to restart energizing through the three-phase stator coil of the assist motor 7.

Then, when the determination result in step S20 is NO, it is determined whether or not the integral value of power (sum (k): value of this control period) is equal to or more than a determination threshold (first determination value: Threshold) (step S22). When the determination result in this step S22 is YES, the ECU 10 outputs a supply power limiting command to the controller 8 and then sets a power supply limiting flag, that is, turns ON the power supply limiting flag (step S23). With this, the controller 8 limits supply power (motor power: POWER) to the three-phase stator coil of the assist motor 7 to a value equal to or smaller than a specified value, that is, decreases supply power to the three-phase stator coil of the assist motor 7 to supply power (POWER) for limiting power supply which is smaller than this (power supply limiting means: step S24). Thereafter, the processing proceeds to the control processing in step S27.

Then, when the determination result in step S22 is NO, the ECU 10 outputs a power supply command to the controller 8 and then resets the power supply limiting flag, that is, turns OFF the power supply limiting flag (step S25). With this, the controller 8 supplies power (motor power: POWER) to the three-phase stator coil of the assist motor 7, which is computed in step S15, to the three-phase stator coil of the assist motor 7. That is, power is supplied (ON) to (energizing is performed through) the three-phase stator coil of the assist motor 7 in such a way as to cause the motor speed (actual rotational speed) of the assist motor 7 to be nearly equal to the target rotational speed (step S26). With this, as the actual boost pressure ABP becomes lower than the target boost pressure TBP, the rotational speed of the assist motor 7 is further increased. Therefore, even when the rotational speed of the engine is within a low rotational speed range, by assisting supercharging the shortage of actual boost pressure by the assist motor 7, the actual boost pressure ABP is made nearly equal to the target boost pressure TBP. With this, charging efficiency is enhanced and engine output is enhanced.

Next, the integral value of power computed in step S19 (sum (k): value of this control period) is substituted for the integral value of power (sum (k−1): value of the last control period) and is stored for update in the volatile memory such as DRAM or in the nonvolatile memory such as EEPROM (integral power storing means: step 27). With this, every time the integral value of power (sum (k): value of this control period) increases, the integral value of power (sum (k−1): value of the last control period) is updated and is stored in the volatile memory such as DRAM or in the nonvolatile memory such as EEPROM. Thereafter, the processing passes through the control routine in FIG. 4 and FIG. 5.

[Effect of First Embodiment]

As described above, in the turbo-charged engine control system of the present embodiment, as the integral value of power (sum (k): value of this control period), which is the amount of power consumed by the three-phase stator coil of the assist motor 7 for the period of time during which energizing is continuously performed, that is, for the duration between the time to start energizing through the three-phase stator coil of the assist motor 7 and the time of the next control period, becomes larger, the internal temperature (for example, the temperature of a heating part heating when supplied with power) of the assist motor 7 becomes higher. That is, as the integral value of power (sum (k): value of this control period) obtained by integrating supply power to the three-phase stator coil of the assist motor 7 with respect to time becomes larger, the temperature of the three-phase stator coil of the assist motor 7 (motor temperature) becomes higher.

Then, the integral value of power (sum (k): value of this control period) for the period of time during which energizing is continuously performed, that is, for the duration between the time to start energizing through the three-phase stator coil of the assist motor 7 and the time of the next control period is detected (computed), and when this detected integral value of power (sum (k): value of this control period) reaches (or exceeds) a previously set determination threshold (first determination value: Threshold), supply power to the three-phase stator coil of the assist motor 7 is limited to a value equal to or smaller than a specified value. Then, even when the supply power to the three-phase stator coil of the assist motor 7 is limited to the value equal to or smaller than the specified value, when the detected integral value of power (sum (k): value of this control period) reaches (or exceeds) a determination threshold (second determination value: Threshold), which is previously set in such a way that the internal temperature of the assist motor 7 does not exceed an upper limit for taking measures to protect the motor from being overheated (for example, a motor temperature over which there is an extremely high possibility that the three-phase stator coil might be degraded and broken), supplying power to the three-phase stator coil of the assist motor 7 is stopped (OFF).

With this, it is possible to take measures against failure caused by the overheating of the assist motor 7 (measures to prevent the assist motor 7 from being overheated) without necessitating a temperature sensor. Accordingly, it is possible to enhance the reliability and durability of such a supercharging assist control system provided with the assist motor 7 that is placed under comparatively high temperature environment. Moreover, because there is no need for additionally providing a temperature sensor, it is possible to prevent the problem of increasing wiring and cost. Furthermore, there is not presented a problem that it is impossible to prevent the overheat of the assist motor 7. Still furthermore, unless the integral value of power (sum (k): value of this control period) exceeds the determination threshold (second determination value: Threshold) supplying power to the three-phase stator coil of the assist motor 7 is not stopped and hence it is possible to use the assist motor 7 continuously or intermittently for a long time. With this, it is possible to decrease the frequency with which the effect of supercharging assist is not produced.

Here, as supply power to the three-phase stator coil of the assist motor 7 per unit time becomes larger or as time during which energizing is continuously performed through the assist motor 7 becomes longer, the rate of increase in motor temperature with respect to the motor temperature before starting energizing or the estimated motor temperature of the last control period (motor temperature: value of the last control period) for the duration between this control period and the next control period is different. For example, the rate of increase in motor temperature with respect to supply power per unit time (duration between this control period and the next control period) is different between a case where energizing is continuously performed for five seconds for the duration between the time to start energizing and this control period and where energizing is further continuously performed for the duration between this control period and the next control period and a case where the energizing is continuously performed for ten seconds for the duration between the time to start energizing and this control period and where energizing is further continuously performed for the duration between this control period and the next control period.

Then, it is also recommended that the determination threshold of a threshold (the first determination value or the second determination value) varies on the basis of supply power to the three-phase stator coil of the assist motor 7 per unit time. For example, by setting the first determination value or the second determination value at a smaller value as supply power to the three-phase stator coil of the assist motor 7 per unit time becomes larger or as the time during which energizing is continuously performed through the assist motor 7 becomes longer, it is possible to enhance the reliability and safety of the measures to prevent failure caused by the overheat of the assist motor 7 (measures to prevent an excessive increase in the temperature of the assist motor 7).

Then, for example, even when the detected (computed) integral value of power (sum (k): value of this control period) is the same, as the ambient temperature of the assist motor 7 is higher, the internal temperature of the assist motor 7 more quickly reaches the upper limit for taking measures to protect the overheat of the motor, or even when the detected (computed) integral value of power (sum (k): value of this control period) is the same, as the ambient temperature of the assist motor 7 is lower, the internal temperature of the assist motor 7 more slowly reaches the upper limit for taking measures to protect the overheat of the motor. Then, it is also recommendable to vary the determination threshold (the first threshold or the second threshold) on the basis of the ambient temperature of the assist motor 7 (which can be estimated, for example, by temperature in an engine room or temperature of engine cooling water). For example, by setting the determination threshold (the first threshold or the second threshold) at a smaller value as the ambient temperature of the assist motor 7 is higher, it is possible to enhance the reliability and safety of the measures to prevent failure caused by the overheat of the assist motor 7 (measures to prevent an excessive increase in the temperature of the assist motor 7).

Here, in the present embodiment, the measures to prevent failure caused by the overheat of the assist motor 7 (measures to prevent an excessive increase in the temperature of the assist motor 7) are taken on the basis of the comparison result between the integral value of power (sum (k): value of this control period), which is the amount of power consumed from the time to start energizing through the three-phase stator coil of the assist motor 7 to the next control period, and the determination threshold (the first determination value or the second determination value). However, it is also recommendable to take the measures to prevent failure caused by the overheat of the assist motor 7 (measures to prevent an excessive increase in the temperature of the assist motor 7) on the basis of the comparison result between power supplied to the three-phase stator coil of the assist motor 7 per unit time (for example, one second or one control period) or the integral value of power obtained by integrating supply power to the three-phase stator coil of the assist motor 7 with respect to time and the determination threshold (the first determination value or the second determination value).

Second Embodiment

Figure 7:
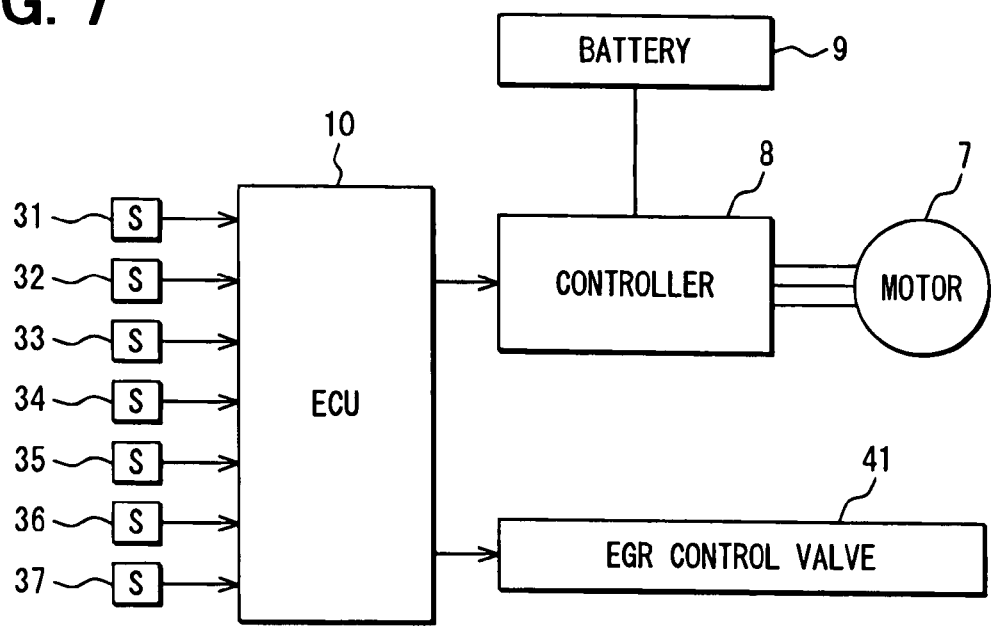
FIG. 7 is a construction diagram showing the control system of a turbo-charged engine control system (second embodiment).
Figure 6:
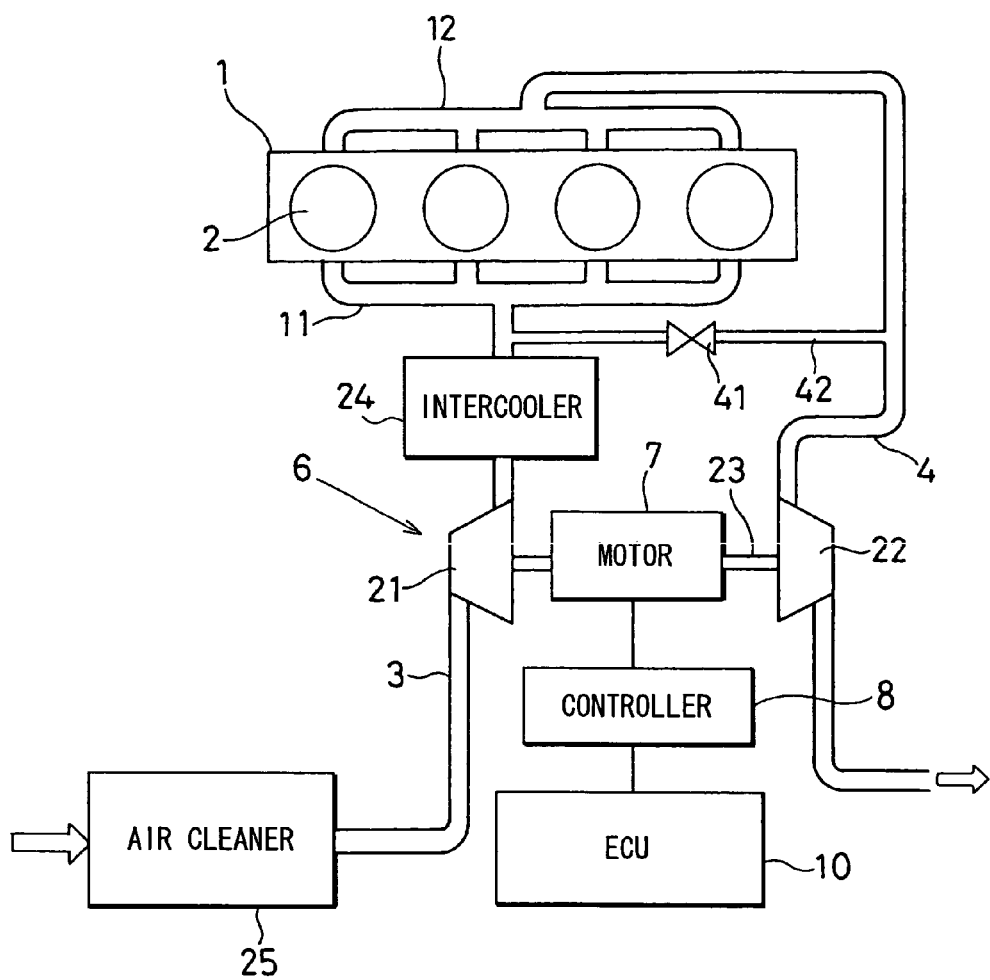
FIG. 6 is a schematic diagram showing a turbo-charged engine and its peripheral devices (second embodiment).

FIGS. 6 to 10 show second embodiment of the present invention. FIG. 6 is a diagram showing the general construction of a turbo-charged engine control system and FIG. 7 is a block diagram showing the control system of the turbo-charged engine control system.

The turbo-charged engine control system of the present embodiment is provided with not only a common rail type fuel injection device, the turbocharger 6, and the assist motor 7, but also an exhaust gas recirculation system (hereinafter referred to as EGR system) for controlling the opening of an exhaust gas recirculation control valve (hereinafter referred to as EGR control valve). This exhaust gas recirculation system is provided with: an exhaust gas recirculation pipe 42 for introducing a portion of exhaust gas flowing through the exhaust passage of the engine exhaust pipe 4 into the intake passage of the engine intake pipe 3; and an EGR control valve 41 for varying the amount of recirculation (EGR amount) of exhaust gas (exhaust recirculation gas: EGR gas) flowing through the exhaust gas recirculation passage of this exhaust gas recirculation pipe 42.

Here, in this embodiment, the upstream end in the direction of flow of air of the exhaust gas recirculation pipe 42 is connected to the engine exhaust pipe 4 for coupling the exhaust port of the engine 1 to the turbine 22 of the turbocharger 6; and the downstream end in the direction of flow of air of the exhaust gas recirculation pipe 42 is connected to the engine intake pipe 3 for coupling a portion (in particular, the exit portion of an intercooler 24) closer to the downstream side in the direction of flow of intake air than the compressor 21 of the turbocharger 6 to the intake port of the engine 1. The EGR control valve 41 is provided with: a valve (valve element) for changing the exhaust gas flowing area of the exhaust gas recirculation passage of the exhaust gas recirculation pipe 42 to vary the EGR amount, that is, the amount of EGR gas, which is a portion of exhaust gas of the engine 1 and is to be mixed into intake air (the rate of EGR gas to new intake air); an actuator of a solenoid valve or a driving motor for driving this valve in the direction to open the valve; and valve biasing means such as spring for biasing the valve in the direction to close the valve.

Then, the amount of recirculation of EGR gas flowing through the exhaust gas recirculation passage of the exhaust gas recirculation pipe 42 is controlled by correcting the opening of the EGR control valve 41 on the basis of the operating state of the engine 1 (for example, the deviation between the amount of new intake air and the target amount of intake air or actual boost pressure or actual intake pressure). Then, an EGR driving circuit for applying an EGR driving current to the actuator of the EGR control valve 41 is interposed between the ECU 10 and the actuator of the EGR control valve 41. Then, the ECU 10 is constructed in such a way that signals of various kinds of sensors such as an air flow meter 36 for detecting the amount of new intake air of the engine 1 and a lift sensor 37 for detecting the amount of valve lift of the EGR control valve 41 are A/D converted by an A/D converter and then are inputted to the microcomputer built-in the ECU 10.

Here, the ECU 10 of this embodiment is provided with motor temperature estimating means for estimating (computing) the internal temperature of the assist motor 7 (for example, temperature of a heating part heating when supplied with power: in particular, the winding part of the assist motor 7 (three-phase stator coil): hereinafter referred to as estimated motor temperature). Then, various motor parameters necessary for estimating this estimated motor temperature are previously stored and held in the volatile memory such as DRAM or the nonvolatile memory such as EEPROM. Here, in this embodiment, a map is stored and held as one of motor parameters in the volatile memory such as DRAM or the nonvolatile memory such as EEPROM: such a map is made by measuring the correlation between a motor temperature when energizing is not performed through the assist motor 7, that is, a motor temperature before starting to supply power to the three-phase stator coil of the assist motor 7, or a motor temperature before starting energizing, which corresponds to the internal temperature of the assist motor 7 (temperature of the three-phase stator coil: hereinafter referred to as motor temperature), and the operating state of the engine 1 by experiment or the like.

This motor temperature before starting energizing {TH(NE(T0), Q(T0))} can be estimated, for example, by the use of a computing equation of the following equation 2 using the engine speed and the command mount of injection.

$$TH(NE(T0), Q(T0)) = K \times f(NE(T0), Q(T0)) \quad (2)$$

where K is a coefficient, and NE(T0) is the engine speed before starting energizing through the three-phase stator coil of the assist motor 7 (in the last control period), and Q(T0) is the command amount of injection before starting energizing through the three-phase stator coil of the assist motor 7 (in the last control period).

Then, in this embodiment, specific heat, motor mass, thermal energy in loss (when motor load is maximum), the amount of heating (when supply power is maximum) per unit time (for example, for one second or one control period), and the rate of increase in motor temperature to supply power to the three-phase stator coil of the assist motor 7 per unit time (for example, for one second or one control period) are previously stored and held as other motor parameters in the volatile memory such as DRAM or the nonvolatile memory such as EEPROM.

Then, it is also recommendable to use the rate of increase in motor temperature to the integral value of power obtained by integrating supply power to the three-phase stator coil of the assist motor 7 with respect to time, or the rate of increase in motor temperature to the integral value of power (sum (k)), which is the amount of power consumed from the time to start energizing through the three-phase stator coil of the assist motor 7 to the time of the next control period, as the rate of increase in motor temperature.

[Control Method for Second Embodiment]

Figure 8:
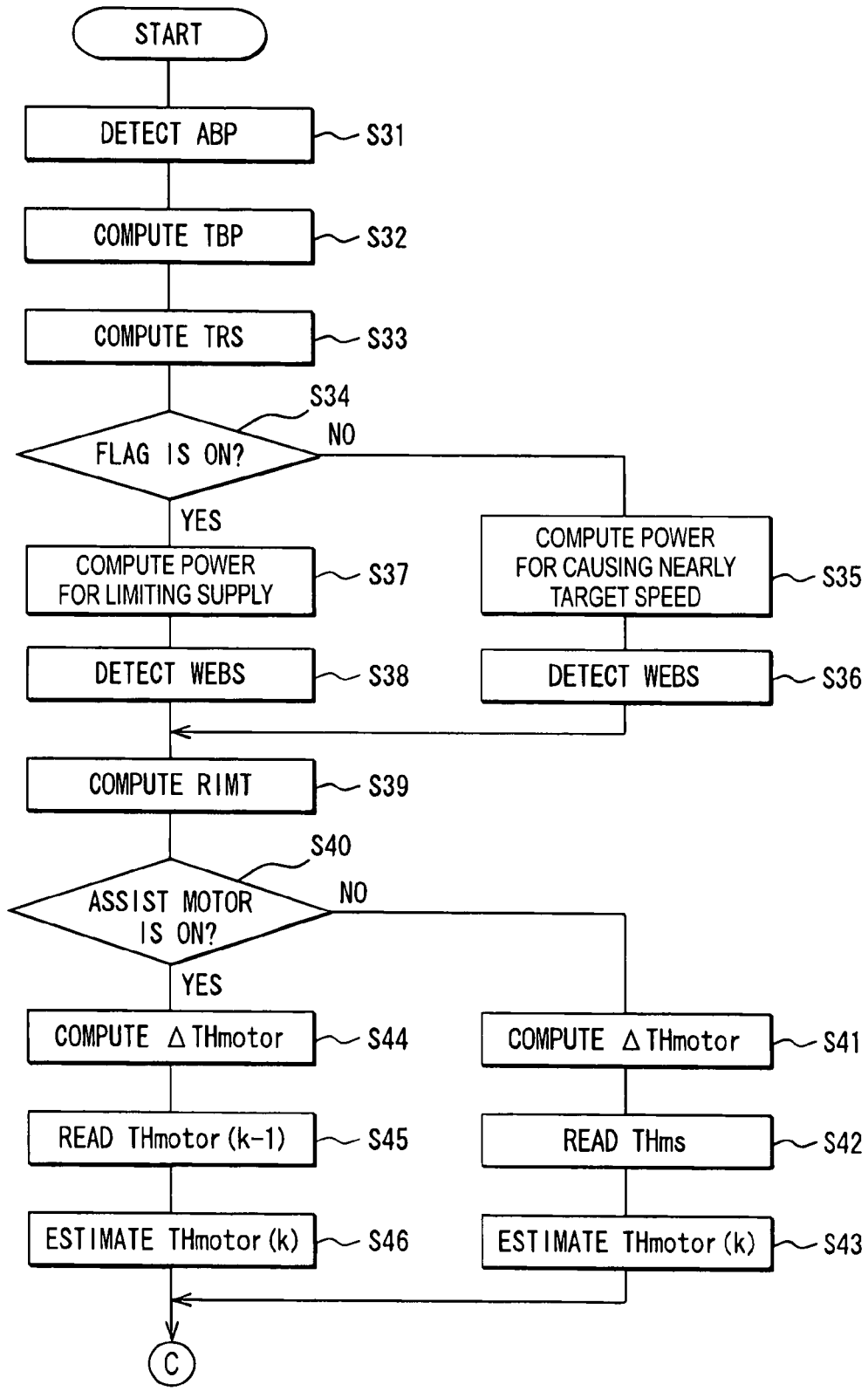
FIG. 8 is a flow chart showing a method for controlling the rotational speed of an assist motor (second embodiment).
Figure 9:
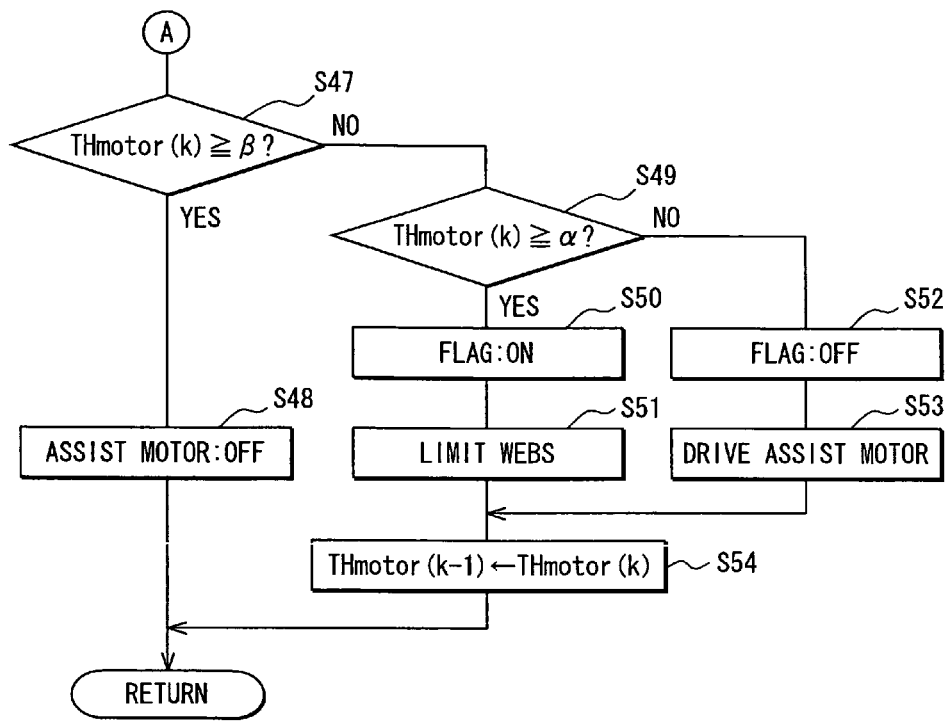
FIG. 9 is a flow chart showing a method for controlling the rotational speed of the assist motor (second embodiment).

Next, a method for controlling the turbocharged engine control system of this embodiment will be described in brief on the basis of FIG. 3, FIGS. 6 to 10. Here, FIG. 8 and FIG. 9 are flow charts showing a method for controlling the rotational speed of assist motor 7 (motor speed). The control routine in FIG. 8 and FIG. 9 is repeatedly performed for each specified control period when a supercharging assist mode is performed.

Here, this embodiment is constructed in such a way that the control routine in FIG. 8 and FIG. 9 is performed when step S9 in the flow chart in FIG. 3 (assist motor rotation control) is performed. Then, in the case of this embodiment, step S5 in the flow chart in FIG. 3 is determination processing for determining whether or not an estimated motor temperature (THmotor (k−1): value of the last control period) is stored in the volatile memory such as DRAM or the nonvolatile memory such as EEPROM.

Then, step S7 in the flow chart in FIG. 3 is to erase the estimated motor temperature (THmotor (k−1): value of the last control period) stored in the volatile memory such as DRAM or the nonvolatile memory such as EEPROM or to reset the estimated motor temperature (THmotor (k−1): value of the last control period). Specifically, step S7 in the flow chart in FIG. 3 is control processing for returning the estimated motor temperature (THmotor (k−1): value of the last control period) having been integrated, stored, and held by the last control period to the initial state (for example, motor temperature before starting energizing).

First, an electric signal outputted from the boost pressure sensor 35 is inputted to detect an actual boost pressure ABP (step S31). Next, a target boost pressure TBP is computed from the engine speed and the command amount of injection (or acceleration position) (step S32). Next, a target rotational speed TRS in this control period is computed according to the deviation between an actual boost pressure detected by the boost pressure sensor 35 and the target boost pressure (step S33).

Next, it is determined whether or not the power supply limiting flag is set (ON) (step S34). When the determination result in this step S34 is NO, supply power (motor power: POWER) to the three-phase stator coil of the assist motor 7, which is necessary for causing the actual rotational speed of the assist motor 7 to be nearly equal to the target rotational speed is computed (step S35). Next, supply power (WEBS: hereinafter abbreviated as supply power per unit time) to the three-phase stator coil of the assist motor 7 per unit time (for the duration between this control period and the next control period) is detected (computed) (integral power detecting means: step S36). Thereafter, the processing proceeds to the determination processing of step S39.

Then, when the determination result in step S34 is YES, supply power for limiting power supply (motor power: POWER) is computed (step S37). Next, supply power (WEBS: hereinafter abbreviated as supply power for limiting power supply) for limiting power supply to the three-phase stator coil of the assist motor 7 per unit time (for the duration between this control period and the next control period) is detected (computed) (integral power detecting means: step S38). Next, the rate of increase in motor temperature RIMT with respect to the supply power (WEBS) per unit time or the supply power (WEBS) for limiting power supply, which is computed in step S36 or step S38, is computed (step S39).

Here, the rate of increase in motor temperature with respect to the supply power (WEBS) per unit time or the supply power (WEBS) for limiting power supply is found by a computing equation of the following equation 3.

$$\text{Rate of increase in motor temperature} = \text{WEBS} \times \eta \quad (3)$$

where WEBS is supply power per unit time or supply power for limiting power supply.

Then, η is the efficiency of increasing temperature with respect to the supply power per unit time or the supply power for limiting power supply. This is the efficiency of increasing temperature with respect to WEBS when supply power (WEBS) per unit time or supply power (WEBS) for limiting power supply is supplied to the three-phase stator coil of the assist motor 7 for the duration between this control period and the next control period. This efficiency of increasing temperature with respect to WEBS is previously stored and held in the volatile memory such as DRAM or the nonvolatile memory such as EEPROM. Then, it is also recommendable to read this efficiency of increasing temperature with respect to WEBS from a map made by measuring the relationship between them by experiment or the like.

Next, it is determined whether or not energizing is performed (ON) through the three-phase stator coil of the assist motor 7 by the last control period. That is, it is determined whether or not the three-phase stator coil of the assist motor 7 is ON (step S40). When the determination result in this step 40 is NO, it can be determined that this control period is time to start energizing through the three-phase stator coil of the assist motor 7 and hence a value of increase (ΔTHmotor) in motor temperature with respect to the motor temperature before starting energizing is computed (step S41).

This value of increase (ΔTHmotor) in motor temperature with respect to the motor temperature before starting energizing is found by a computing equation of the following equation 4.

$$\Delta TH\text{motor}=WEBS\times\eta\times\Sigma\{L/(Cp\times M)\} \tag{4}$$

where L is thermal energy (J/sec) in loss when assist motor load is maximum and Cp is specific heat (J/g·K) and M is the mass of motor.

These motor parameters are previously stored and held in the volatile memory such as DRAM or the nonvolatile memory such as EEPROM. Then, as the supply power (WEBS) per unit time is larger, the value of increase (ΔTHmotor) in motor temperature with respect to the motor temperature before starting energizing is set at a value on a higher temperature side. Then, it is also recommendable to read this ΔTHmotor from a map made by measuring the relationship between them by experiment or the like.

Next, a motor temperature before starting energizing THms is read from the map previously stored and held in the volatile memory such as DRAM or the nonvolatile memory such as EEPROM, the engine speed, and the command amount of injection (step S42). Next, the value (ΔTHmotor) of increase in motor temperature with respect to the motor temperature before starting energizing is added to this read motor temperature before starting energizing to thereby estimate (compute) an estimated motor temperature of this control period (THmotor (k): value of this control period) when supply power (WEBS) per unit time, which is computed in step S36, is supplied to the three-phase stator coil of the assist motor 7 for the duration between this control period and the next control period (motor temperature estimating means: step S43). Thereafter, the processing proceeds to the determination processing in step S47.

This estimated motor temperature (THmotor (k): value of this control period) is found by a computing equation of the following equation 5.

$$TH\text{motor}(k)=TH(NE(T\mathbf{0}),Q(T\mathbf{0}))+\Delta TH\text{motor} \tag{5}$$

where TH(NE(T0), Q(T0)), as described above, is a motor temperature (initial state) before starting energizing, which is read from the map made by measuring by experiment or the like, and ΔTHmotor, as described above, is the value of increase in motor temperature with respect to the motor temperature before starting energizing. Then, it is also recommendable to read this THmotor (k) from the map made by measuring the relationship between them by experiment or the like.

Then, when the determination result in step S40 is YES, it can be determined that energizing through the three-phase stator coil of the assist motor 7 is started by the last control period and that energizing is being continuously performed through the three-phase stator coil of the assist motor 7 in this control period. Then, the value (ΔTHmotor) of increase in motor temperature with respect to the motor temperature (=estimated motor temperature (THmotor (k−1): value of the last control period), which has been stored and held by the last control period in the volatile memory such as DRAM or the nonvolatile memory such as EEPROM, is computed (step S44).

This value (ΔTHmotor) of increase in motor temperature with respect to the estimated motor temperature (=estimated motor temperature (THmotor (k−1): value of the last control period) is found by a computing equation of the following equation 6.

$$\Delta TH\text{motor}=WEBS\times\eta\times\Sigma\{L/(Cp\times M)\} \tag{6}$$

where L is thermal energy (J/sec) in loss when assist motor load is maximum and Cp is specific heat (J/g·K) and M is the mass of motor.

These motor parameters are previously stored and held in the volatile memory such as DRAM or the nonvolatile memory such as EEPROM. Then, as supply power (WEBS) per unit time or supply power (WEBS) for limiting power supply is larger or as time during which energizing is continuously performed through the three-phase stator coil of the assist motor 7 is longer, the value of increase (ΔTHmotor) in motor temperature with respect to the estimated motor temperature (THmotor (k−1): value of last control period) is set at a value on a higher temperature side. Then, it is also recommendable to read this ΔTHmotor from a map made by measuring the relationship between them by experiment or the like.

Next, an estimated motor temperature (THmotor (k−1): value of the last control period) previously stored and held in the volatile memory such as DRAM or the nonvolatile memory such as EEPROM is read (step 45). Next, the value of increase in motor temperature (ΔTHmotor) with respect to the estimated motor temperature (THmotor (k−1): value of the last control period) is integrated with (added to) this estimated motor temperature (THmotor (k−1): value of the last control period), which is read, to estimate an estimated motor temperature of this control period (THmotor (k): value of this control period) when the power supply (WEBS) per unit time or the supply power (WEBS) for limiting power supply, which is computed in step S36 or step S38, is supplied to the three-phase stator coil of the assist motor 7 for the duration between this control period and the next control period (motor temperature estimating means: step S46).

This estimated motor temperature (THmotor (k): value of this control period) is found by a computing equation of the following equation 7.

$$TH\text{motor}(k)=TH\text{motor}(k-1)+\Delta TH\text{motor} \tag{7}$$

where THmotor(k−1), as described above, is the estimated motor temperature previously stored and held in the volatile memory such as DRAM or the nonvolatile memory such as EEPROM and ΔTHmotor, as described above, is the value of increase in motor temperature with respect to the estimated motor temperature (THmotor(k−1): value of the last control period), that is, a motor temperature integrated by the last control period. Then, it is also recommendable to read this THmotor (k) from the map made by measuring the relationship between them by experiment or the like.

Next, it is determined whether or not the estimated motor temperature (THmotor (k): value of this control period), which is computed in step S43 or step S46, is equal to or larger than a determination threshold (second determination value: β)(step S47). When the determination result in step S47 is YES, the ECU 10 outputs a supply power cutting command to the controller 8. With this, the controller 8 stops (OFF) supplying power to (energizing through) the three-phase stator coil of the assist motor 7 (power supply limiting means: step S48). Thereafter, the processing passes through the control routine in FIG. 8 and FIG. 9.

Then, when the determination result in step S47 is NO, it is determined whether or not the estimated motor temperature (THmotor (k): value of this control period), which is computed in step S43 or step S46, is equal to or larger than a determination threshold (first determination threshold: α) (step S49). When the determination result in step S49 is YES, the ECU 10 outputs a supply power limiting command to the controller 8 and then sets a power supply limiting flag, in other words, turns ON the power supply limiting flag (step S50). With this, the controller 8 limits power supply to the three-phase stator coil of the assist motor 7 to a value equal to or smaller than a specified value (power supply limiting means: step S51). Thereafter, the processing proceeds to the control processing of step S54.

Here, to limit supply power per unit time to the three-phase stator coil of the assist motor 7 to a value smaller than a specified value is to decrease supply power per unit time (WEBS) to supply power (WEBS) for limiting power supply, which is smaller than the supply power per unit time. At this time, in a case where there is produced a harmful effect such as impact when supply power (motor power: POWER) is decreased to a value equal to or smaller than a specified value, it is necessary to avoid a sudden change (drop) in the rotational speed of the assist motor 7. In this case, as shown in a timing chart in FIG. 10, it is also recommendable to employ some contrivance (means for performing gradual power control) to gradually decrease supply power (POWER) from steady supply power (POWER) to a value equal to or smaller than a specified value for the duration between the time (T1) of this control period and the time (T2) of the next control period. Then, in the case of performing this gradual power control, it is also recommendable to perform the gradual power control continuously for the duration between this control period and the next control period or for the duration between this control period and the control period after next that is after the next control period.

Then, when the determination result in step S49 is NO, the ECU 10 outputs a power supply command to the controller 8 and resets the power supply limiting flag, that is, turns OFF the power supply limiting flag (step S52). With this, the controller 8 supplies the supply power (WEBS) per unit time, which is computed in step S36, to the three-phase stator coil of the assist motor 7. That is, the controller 8 supplies (ON) power to (energizes) the three-phase stator coil of the assist motor 7 so as to cause the motor speed (actual rotational speed) of the assist motor 7 to be nearly equal to the target rotational speed (step S53). With this, as the actual boost pressure becomes lower than the target boost pressure, the rotational speed of the assist motor 7 is further increased. Hence, even when the engine speed is within a lower rotational speed range, by assisting to supercharge the insufficient portion of the actual boost pressure by the assist motor 7, the actual boot pressure can be made nearly equal to the target boost pressure. With this, charging efficiency is enhanced and engine power is enhanced.

Next, the estimated motor temperature (THmotor (k): value of this control period) computed in step S43 or step S46 is substituted for the estimated motor temperature (THmotor (k−1): value of the last control period) and is stored for update in the volatile memory such as DRAM or nonvolatile memory such as EEPROM (motor temperature storing means: step S54). With this, every time the estimated motor temperature (THmotor (k): value of this control period) increases, the estimated motor temperature (THmotor (k−1): value of the last control period) is updated and stored in the volatile memory such as DRAM or in the nonvolatile memory such as EEPROM. Thereafter, the processing passes through the control routine in FIG. 8 and FIG. 9.

[Features of Second Embodiment]

Next, a method for limiting supply power by which supply power to the three-phase stator coil of the assist motor 7 is limited on the basis of a motor temperature. Here, FIG. 10 is a timing chart showing a method for controlling supply power with respect to a motor temperature.

First, it is determined at the time (T0) to start energizing that an operating state is in an accelerating state where supercharging assist is necessary and an operational mode is switched to a supercharging assist mode and hence energizing through the three-phase stator coil of the assist motor 7 is started. At this time, the ECU 10 computes such a supply power (POWER) to the three-phase stator coil of the assist motor 7 that is required to cause the actual rotational speed of the assist motor 7 to be nearly equal to the target rotational speed. Then, this supply power (POWER) is supplied to the three-phase stator coil of the assist motor 7 to control the energizing through the three-phase stator coil of the assist motor 7, whereby the assist motor 7 is controlled in such a way that the actual rotational speed of the assist motor 7 is nearly equal to the target rotational speed. Then, when power is continuously supplied to the three-phase stator coil of the assist motor 7 from the time (T0) to start energizing to time (T1), the motor temperature increases with the passage of time. Here, the estimated motor temperature (THmoto (k): value of this control period) is estimated by the above-mentioned computing method without using a temperature sensor.

Figure 10:
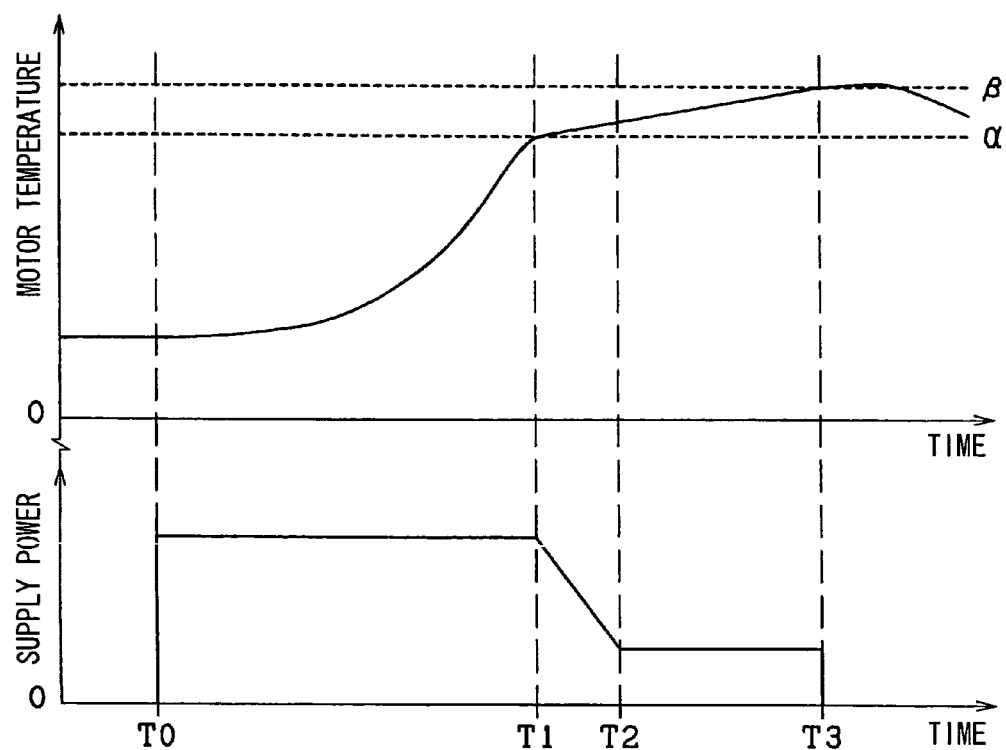
FIG. 10 is a timing chart showing a method for controlling supply power with respect to a motor temperature (second embodiment).

In the timing chart shown in FIG. 10, power is continuously supplied to the three-phase stator coil of the assist motor 7 from the time (T0) to start energizing to the time (T1). As a result, when the estimated motor temperature (THmoto (k): value of this control period) estimated by the ECU 10 exceeds the determination threshold (first determination value: α) at the time (T1), the supply power (POWER) to the three-phase stator coil of the assist motor 7 is limited to a value equal to or smaller than a specified value, whereby a sudden increase in temperature can be prevented. At this time, in the case where there is a harmful effect such as impact when the supply power is suddenly decreased to a value equal to or smaller than the specified value, to avoid a sudden change in the rotational speed of the assist motor 7, it is also recommendable to employ some contrivance (means for performing gradual power control) to gradually decrease the supply power (POWER) from a steady supply power (POWER) to a value equal to or smaller than a specified value for the duration between the time (T1) and time (T2).

Then, power supply to the three-phase stator coil of the assist motor 7 is limited from the time (T1) to the time (T2) and further to time (T3). As a result, when the estimated motor temperature (THmoto (k): value of this control period) exceeds a determination threshold (second determination value: β) at the time (T3), the supply power is forcibly cut, that is, the power supply to the three-phase stator coil of the assist motor 7 is stopped. In other words, energizing through the three-phase stator coil of the assist motor 7 is stopped. With this, it is possible to prevent the deterioration and failure of the three-phase stator coil of the assist motor 7.

Here, as the supply power per unit time or the supply power for limiting power supply becomes larger or as the time during which energizing is continuously performed through the assist motor 7 becomes longer, the rate of increase in motor temperature with respect to the motor temperature before starting to energizing or the estimated motor temperature of the last control period (motor temperature: value of the last control period) for the duration between this control period and the next control period is different. For example, the rate of increase in motor temperature with respect to the supply power per unit time or the supply power for limiting power supply is different between a case where energizing is continuously performed for five seconds for the duration between the time to start energizing and this control period and where energizing is further continuously performed for the duration between this control period and the next control period and a case where energizing is continuously performed for ten seconds for the duration between the time to start energizing and this control period and where energizing is further continuously performed for the duration between this control period and the next control period.

Then, it is also recommended that the determination threshold of a threshold (the first determination value or the second determination value) vary on the basis of the supply power per unit time or the supply power for limiting power supply. Alternatively, it is also recommended that the rate of increase in motor temperature with respect to the supply power per unit time or the supply power for limiting power supply varies on the basis of the supply power per unit time or the supply power for limiting power supply. For example, by setting the first determination value or the second determination value at a smaller value as the supply power per unit time or the supply power for limiting power supply becomes larger or as the time during which energizing is continuously performed through the assist motor 7 becomes longer. Alternatively, by setting the rate of increase in motor temperature at a larger value as the supply power per unit time becomes larger or the time during which the energizing is continuously performed through the assist motor 7 becomes longer, it is possible to enhance the reliability and safety of the measures to prevent failure caused by the overheat of the assist motor 7 (measures to prevent an excessive increase in the temperature of the assist motor 7).

Then, for example, even when the supply power per unit time or the supply power for limiting power supply, which is detected (computed), is the same, as the ambient temperature of the assist motor 7 is higher, the internal temperature of the assist motor 7 more quickly reaches the upper limit for taking measures to protect the motor from being overheated. Alternatively, even when the supply power per unit time or the supply power for limiting power supply, which is detected (computed), is the same, as the ambient temperature of the assist motor 7 is lower, the internal temperature of the assist motor 7 more slowly reaches the upper limit for taking measures to protect the motor from being overheated.

Then, it is also recommendable to vary the determination threshold (the first determination value or the second determination value) on the basis of the ambient temperature of the assist motor 7 (which can be estimated, for example, by temperature in an engine room or temperature of engine cooling water).

Alternatively, it is also recommendable to vary the rate of increase in motor temperature with respect to the supply power per unit time or the supply power for limiting power supply on the basis of the ambient temperature of the assist motor 7. For example, by setting the determination threshold (the first determination value or the second determination value) at a smaller value as the ambient temperature of the assist motor 7 is higher, or by setting the rate of increase in motor temperature at a larger value as the ambient temperature of the assist motor 7 is higher, it is possible to enhance the reliability and safety of the measures to prevent failure caused by the overheat of the assist motor 7 (measures to prevent an excessive increase in the temperature of the assist motor 7).

Here, in the present embodiment, the rate of increase in motor temperature with respect to the supply power per unit time or the supply power for limiting power supply is found, and the value of increase in motor temperature with respect to the estimated motor temperature (value of the last control period) is found by the use of this found rate of increase in motor temperature. This found value of increase in motor temperature is added to (integrated with) the estimated motor temperature (value of the last control period), to thereby estimate an estimated motor temperature (value of this control period). Alternatively, the rate of increase in motor temperature with respect to the supply power per unit time is found, and the value of increase in motor temperature with respect to the motor temperature before starting energizing is found by the use of this found rate of increase in motor temperature. This found value of increase in motor temperature is added to (integrated with) the temperature before starting energizing, to thereby estimate an estimated motor temperature (value of this control period). With this, it is possible to estimate the internal temperature of the assist motor 7 (in particular, the temperature of the three-phase stator coil: motor temperature) with high accuracy and with precision without providing a temperature sensor.

Then, it is also recommendable to estimate an estimated motor temperature (value of this control period): by finding the rate of increase in motor temperature with respect to the supply power per unit time or the supply power for limiting power supply; by integrating this rate of increase in motor temperature with respect to time to find the value of increase in motor temperature with respect to the motor temperature before starting energizing; and by adding this value of increase in motor temperature with respect to the motor temperature before starting energizing to the motor temperature before starting energizing. In this regard, in a case where supply power to the three-phase stator coil of the assist motor 7 is made a constant value from the time to start energizing to the time to finish energizing, it can be predicted that when a specified time passes from the time to start energizing, the internal temperature (actual motor temperature) of the assist motor 7 exceeds the determination threshold (the first determination value or the second determination value).

Then, when a specified time (for example, in FIG. 10, time from the time T0 to start energizing to the time T1) passes from the time to start energizing through the three-phase stator coil of the assist motor 7, the ECU 10 outputs a supply power limiting command to the controller 8 to limit power supply to the assist motor 7. Further, when a specified time (for example, in FIG. 10, time from the time T1 to the time T3) passes from the time to output the supply power limiting command, the ECU 10 outputs a supply power cutting command to the controller 8 to stop (OFF) supplying power to (energizing through) the assist motor 7. Also in this case, it is possible to produce the same effect as in this embodiment.

Third Embodiment

Figure 11:
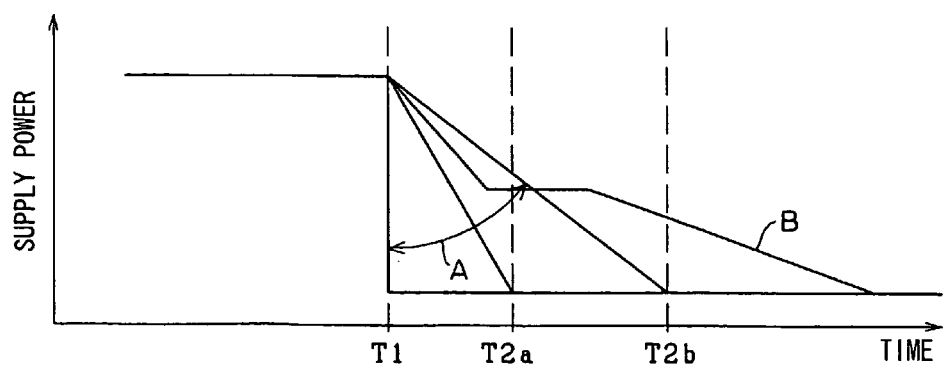
FIG. 11 is a timing chart showing a method for gradually controlling power (third embodiment).

FIG. 11 shows third embodiment of the present invention and is a timing chart showing a method for controlling power gradually.

In the turbo-charged engine control system of this embodiment, when the estimated motor temperature (THmotor (k): value of this control period) exceeds the determination threshold (the first determination value: α) at the time (T1), the supply power (POWER) to the three-phase stator coil of the assist motor 7 is limited to a value equal to or smaller than a specified value. That is, the supply power (WEBS) per unit time is decreased to the supply power (WEBS) for limiting power supply smaller than this supply power (WEBS) per unit time to prevent a sudden increase in motor temperature. At this time, when there is produced a harmful effect such as impact when supply power (WEBS) per unit time is decreased to a specified value (=supply power (WEBS) for limiting power supply), it is necessary to avoid a sudden change in the rotational speed of the assist motor 7.

For this reason, there is employed some contrivance (means for performing gradual power control) to decrease steady supply power (POWER=supply power (WEBS) per unit time) to the supply power (POWER=supply power (WEBS) for limiting power supply) of the target control value for the duration between the time (T1) and the time (T2). Then, supply power (POWER) supplied to the three-phase stator coil of the assist motor 7, or supply power (WEBS) per unit time or supply power (WEBS) for limiting power supply is continuously decreased at a specified amount of gradient (inclination) per unit time (for the duration between the time (T1) and the time (T2)).

Here, an optimum value in a period during which power is gradually controlled, that is, the duration between the time (T1) and the time (T2), which is shown in the timing chart in FIG. 11 is different depending on the reason of performance required of the turbocharger 6, the reason of preventing deterioration in the performance of the assist motor, or the reason of supercharging assist control at the time of the supercharging assist mode. Therefore, it is preferable that the optimum value is determined according to these reasons.

For example, when the deviation between an actual boost pressure and the target boost pressure is small and the rotational speed (actual rotational speed) of the assist motor 7 can be quickly decreased to the rotational speed for limiting power supply corresponding to the supply power (WEBS) for limiting power supply, as shown in the timing chart in FIG. 11, a correction is made so as to gradually decrease supply power to the supply power (WEBS) for limiting power supply, which is the target control value, when time passes from the time (T1) to the time (T2a) to thereby shorten the period during which the power is gradually controlled. Then, when the deviation between an actual boost pressure and the target boost pressure is yet large and it is desired to delay the time to decrease the rotational speed (actual rotational speed) of the assist motor 7 to the rotational speed for limiting power supply corresponding to the supply power (WEBS) for limiting power supply, as shown in the timing chart in FIG. 11, a correction is made so as to gradually decrease supply power to the supply power (WEBS) for limiting power supply, which is the target control value, when time passes from the time (T1) to the time (T2b) to thereby elongate the period during which the power is gradually controlled.

Then, when supply power (WEBS) per unit time for the period from the time to start energizing to the time (T1), during which energizing is continuously performed, is large, or when the ambient temperature of the assist motor 7 is high, the rate of increase in motor temperature with respect to the motor temperature before starting energizing or the estimated motor temperature of the last control period (motor temperature: value of the last control period) is large. Then, when the supply power (WEBS) per unit time is large or when the ambient temperature of the assist motor 7 is high, a correction is made so as to shorten the period during which power is gradually controlled. Then, conversely, when the supply power (WEBS) per unit time is small or when the ambient temperature of the assist motor 7 is low, a correction is made so as to elongate the period during which power is gradually controlled. Therefore, the inclination when supply power is continuously decreased at a specified amount of gradient per unit time (for the duration between the time (T) to the time (T2)) varies within a specified range (A) according to the above-mentioned reasons.

Moreover, it is not necessary to stick to an inclination of one step when limiting power supply but it is also recommendable to employ a method for limiting power supply by which power supply is decreased stepwise at an inclination varying at two or more steps, as shown by a solid line B in the timing chart in FIG. 11. That is, it is also recommendable to decrease supply power (POWER) supplied to the three-phase stator coil of the assist motor 7, or supply power (WEBS) per unit time or supply power (WEBS) for limiting power supply in a stepwise manner by a specified amount of step per unit time (for the duration between the time (T1) to the time (T2)). Then, as shown by the solid line B in the timing chart in FIG. 11, it is also recommendable to combine a method for continuously decreasing supply power at a specified amount of gradient (inclination) per unit time with a method for decreasing supply power in a stepwise manner by a specified amount of step per unit time for the period of the gradual power control.

[Modifications]

In this embodiment, supply power (POWER) supplied to the three-phase stator coil of the assist motor 7 is adjusted on the basis of control signal of the ECU 10 (power supply command, supply power limiting command, supply power cutting command) to control the rotational speed of the assist motor 7. However, it is also recommended that alternating voltage and frequency outputted from the inverter are adjusted on the basis of the control signal of the ECU 10 (power supply command, supply power limiting command, supply power cutting command) to control the rotational speed of the assist motor 7.

In this embodiment, when the rate of change in the position of the accelerator is equal to or larger than a specified value, it is determined that an operating state is in an accelerating state where supercharging assist is required. However, it is also recommendable to determine that an operating state is in an accelerating state where supercharging assist is required when the rate of change in the command amount of injection or the rate of change in the target fuel pressure is equal to or larger than a specified value. Then, it is also recommendable to determine that the accelerator pedal is pressed down to bring the operating state into the accelerating state when the rate of change in the position of the acceleration is equal to or larger than a first specified value and to switch the operational mode to the supercharging assist mode.

Moreover, it is also recommendable to determine that the operating state is in a decelerating state where an acceleration pedal is returned when the rate of change in the position of the accelerator is equal to or smaller than a second specified value, which is smaller than a first specified value, and to switch the operational mode to a power regeneration mode. Furthermore, it is also recommendable to switch the operational mode to the supercharging assist mode when road on which a vehicle runs is an uphill. Still furthermore, it is also recommendable to switch the operational mode to the power generation mode when road on which a vehicle runs is a downhill.

In this embodiment, the example in which an alternating current (AC) motor such as three-phase induction motor generator is used has been described as the assist motor 7. However, it is also recommendable to use a brushless DC motor or a direct current (DC) motor with a brush as the assist motor 7. In this case, the assist motor 7 has only a function as a motor. Moreover, it is also recommendable to interpose a gear reduction mechanism for reducing the rotational speed of the output shaft of the assist motor 7 so as to offer a specified speed reduction ratio between the output shaft of the assist motor 7 and the rotor shaft (turbine shaft) 23.

In this embodiment, the example of employing a turbocharger provided with a motor, which supercharges intake air sucked into the combustion chambers 2 of the respective cylinders of the engine 1 by the use of exhaust energy of the engine 1, as a supercharger has been described. However, it is also recommendable to employ an electrically operated compressor, which supercharges intake air sucked into the combustion chambers 2 of the respective cylinders of the engine 1 by the use of exhaust energy of the engine 1, as a supercharger. Moreover, it is also recommendable to employ such a supercharger provided with a motor that supercharges intake air sucked into the combustion chambers 2 of the respective cylinders of the engine 1 by the use of the driving torque of a driving motor.

In this embodiment, the temperature of a motor winding part, which is a heating part built in the assist motor 7, (for example, temperature of the three-phase stator coil (armature winding)=estimated motor temperature) is estimated (computed) as the internal temperature of the assist motor 7. However, it is also recommendable to estimate (compute) the temperature (=estimated motor temperature) of the motor winding part (for example, field winding) of a driving motor such as assist motor 7.

In this embodiment, a target rotational speed in this control period is computed according to the deviation between the actual boost pressure detected by the boost pressure sensor 35 and the target boost pressure, and then supply power (motor power: POWER) to the three-phase stator coil of the assist motor 7, which is required to cause the actual rotational speed of the assist motor 7 to be nearly equal to the target rotational speed, is computed. Then the supply power (POWER) to the three-phase stator coil of the assist motor 7 is integrated with respect to time to thereby detect (compute) the integral value of power (POWER (k)). However, it is also recommendable to compute a target rotational speed corresponding to the deviation between the actual boost pressure (or intake pressure) and the target boost pressure; the target (new) amount of intake air, an intake pressure, an intake temperature, an engine speed, the rate of change in the position of an accelerator, or a target boost pressure, and then to detect (compute) the integral value of power (POWER (k)) or the cumulative value of power, or supply power (WEBS) per unit time, which corresponds to this target rotational speed.

In this embodiment, the target rotational speed in this control period is computed according to the deviation between the actual boost pressure (or intake pressure) detected by the boost pressure sensor 35 and the target boost pressure and then supply power (motor power: POWER) to the three-phase stator coil of the assist motor 7, which is required to cause the actual rotational speed of the assist motor 7 to be nearly equal to the target rotational speed, is computed, and then supply power (WEBS) per unit time is detected (computed). However, it is also recommendable to compute the target rotational speed corresponding to the deviation between the actual boost pressure (or intake pressure) and the target boost pressure, the target (new) amount of intake air, the intake pressure, the intake temperature, the engine speed, the rate of change in the position of the accelerator, or the target boost pressure, and then to detect (compute) supply power (WEBS) per unit time, the integral value of power (POWER (k)), or the cumulative value of power, which corresponds to this target rotational speed.

What is claimed is:

1. A supercharging assist control system comprising:
   a supercharger for supercharging intake air into a cylinder of an engine;
   a driving motor for driving the supercharger; and
   a motor control device for adjusting power supplied to the driving motor to control a rotational speed of the driving motor,
   wherein the motor control device includes:
   an integral power detecting means for detecting supply power to the driving motor per unit time, a cumulative value of power obtained by cumulating supply power to the driving motor with respect to time, or an integral value of power obtained by integrating supply power to the driving motor with respect to time; and
   a power supply limiting means for limiting power supplied to the driving motor to a value equal to or smaller than a specified value when a detected value by the integral power detecting means is equal to or larger than a first determination value.

2. The supercharging assist control system according to claim 1, wherein:
   the power supply limiting means limits supply power to the driving motor in such a way that an internal temperature of the driving motor does not exceed an upper limit for taking measures to protect a motor from being overheated, and
   the power supply limiting means stops supplying power to the driving motor when the detected value by the integral power detecting means is equal to or larger than a second determination value which is larger than the first determination value.

3. The supercharging assist control system according to claim 2, wherein
   the power supply limiting means varies the first determination value or the second determination value based on the supply power to the driving motor per unit time or an ambient temperature of the driving motor.

4. A supercharging assist control system comprising:
   a supercharger for supercharging intake air sucked into a cylinder of an engine;
   a driving motor for rotating and driving the supercharger; and
   a motor control device for adjusting power supplied to the driving motor to control a rotational speed of the driving motor;

wherein the motor control device includes:
an integral power detecting means for detecting supply power to the driving motor per unit time, a cumulative value of power obtained by cumulating supply power to the driving motor with respect to time, or an integral value of power obtained by integrating supply power to the driving motor with respect to time;
a motor temperature estimating means for detecting a rate of increase in motor temperature with respect to a detected value by the integral power detecting means and for estimating an internal temperature of the driving motor on the basis of the rate of increase in motor temperature and the detected value by the integral power detecting means; and
a power supply limiting means for limiting power supplied to the driving motor to a value equal to or smaller than a specified value when the internal temperature of the driving motor is equal to or larger than a first determination value.

5. The supercharging assist control system according to claim 4, wherein
the power supply limiting means limits supply power to the driving motor in such a that an internal temperature of the driving motor does not exceed an upper limit for taking measures to protect a motor from being overheated and stops supplying supply power to the driving motor when the estimated motor temperature of the motor temperature estimating means is equal to or larger than a second determination value higher than the first determination value.

6. The supercharging assist control system according to claim 5, wherein
the power supply limiting means varies the first determination value or the second determination value on the basis of the supply power to the driving motor per unit time or an ambient temperature of the driving motor.

7. The supercharging assist control system according to claim 4, wherein
the motor temperature estimating means estimates an internal temperature of the driving motor by adding: a motor temperature detected before starting energizing, which is a temperature before supplying the supply power to the driving motor and corresponds to an internal temperature of the driving motor, and a rate of increase in motor temperature derived from a detected value by the integral power detection means.

8. The supercharging assist control system according to claim 4, wherein
the motor temperature estimating means varies a rate of increase in motor temperature with respect to a detected value by the integral power detecting means on the basis of the supply power to the driving motor per unit time or an ambient temperature of the driving motor.

9. The supercharging assist control system according to claim 4, wherein
the motor control device includes a storage means for storing a relationship between the supply power to the driving motor per unit time, the cumulative value of power, or the integral value of power, and a rate of increase in motor temperature that corresponds to the amount of heating per unit time of an internal temperature of the driving motor, which is produced by the supply power to the driving motor per unit time, the cumulative value of power, or the integral value of power.

10. The supercharging assist control system according to claim 1, wherein
the motor control device includes integral power storing means for updating and storing the cumulative value of power or the integral value of power when the cumulative value of power or the integral value of power is increased, and erases the cumulative value of power or the integral value of power, which is stored in the integral power storing means, when energizing through the driving motor is stopped and then a specified condition is satisfied.

11. The supercharging assist control system according to claim 1, wherein
the power supply limiting means continuously decreases the supply power to the driving motor at a specified amount of gradient per unit time or decreases supply power to the driving motor stepwise by a specified amount of step per unit time.

12. The supercharging assist control system according to claim 1, wherein
the supercharger is a turbocharger that has a compressor rotatably housed in an engine intake pipe and a turbine rotatably housed in an engine exhaust pipe and supercharges intake air sucked into a cylinder of the engine by the use of exhaust energy flowing out of the engine,
the driving motor is an assist motor having: a function as a motor for rotating and driving at least the compressor of the turbocharger to assist supercharging; and a function as a generator that is rotated and driven by the exhaust energy to regenerate electricity, and
the assist motor is interposed between the compressor and the turbine in such a manner as to be coaxial with the compressor and the turbine.

* * * * *